(12) United States Patent
Cancemi et al.

(10) Patent No.: US 7,991,055 B2
(45) Date of Patent: Aug. 2, 2011

(54) METHOD AND SYSTEM FOR MULTIPLE DESCRIPTION CODING AND COMPUTER PROGRAM PRODUCT THEREFOR

(75) Inventors: Michele Cancemi, Verona (IT); Andrea Lorenzo Vitali, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1524 days.

(21) Appl. No.: 11/227,995

(22) Filed: Sep. 15, 2005

(65) Prior Publication Data

US 2006/0088107 A1  Apr. 27, 2006

(30) Foreign Application Priority Data

Sep. 16, 2004 (EP) .................................. 04022030

(51) Int. Cl.
*H04N 7/12* (2006.01)
*H04N 11/02* (2006.01)
*H04N 11/04* (2006.01)

(52) U.S. Cl. .......... 375/240.27; 375/240.24; 375/240.12
(58) Field of Classification Search .................. None
See application file for complete search history.

(56) References Cited

U.S. PATENT DOCUMENTS 6,870,876 B1 * 3/2005 Nohlgren et al. ............. 375/220
7,103,669 B2 * 9/2006 Apostolopoulos ............ 709/231

FOREIGN PATENT DOCUMENTS

| DE | 102 04 629 A1 | 9/2002 |
|---|---|---|
| EP | 1 578 131 A1 | 9/2005 |
| EP | 1 578 134 A1 | 9/2005 |
| WO | WO 97/15888 A1 | 5/1997 |
| WO | WO 00/27129 A1 | 5/2000 |
| WO | WO 01/89228 A1 | 11/2001 |
| WO | WO 01/95512 A1 | 12/2001 |
| WO | WO 02/33694 A1 | 4/2002 |
| WO | WO 03/005676 A1 | 1/2003 |
| WO | WO 03/005677 A1 | 1/2003 |
| WO | WO 03/005761 A1 | 1/2003 |
| WO | WO 03/009590 A1 | 1/2003 |
| WO | WO 03/017255 A1 | 2/2003 |
| WO | WO 03/017555 A2 | 2/2003 |
| WO | WO 03/019939 A1 | 3/2003 |
| WO | WO 03/061284 A1 | 7/2003 |
| WO | WO 2004/014083 A1 | 2/2004 |

(Continued)

OTHER PUBLICATIONS

Tan et al. ("Video streaming: concepts, algorithms, and systems", HP Labs, 2002, pp. 1-34).*

(Continued)

*Primary Examiner* — Tom Y Lu
*Assistant Examiner* — Thomas A Conway
(74) *Attorney, Agent, or Firm* — Lisa K. Jorgenson; Jeremiah J. Baunach; Seed IP Law Group PLLC

(57) ABSTRACT

Digital signals, such as image/video signals are converted between a first format and a second format by using Multiple Description Coding, whereby the second format conveys multiple descriptions (D1 to D4; D1' to D4') of the digital signals. In combination with MD coding, the signals are jointly subject to an error concealment process. Preferably, the error concealment process takes place in converting said digital signals from the second format conveying multiple descriptions to the first format.

77 Claims, 13 Drawing Sheets

FOREIGN PATENT DOCUMENTS

| WO | WO 2004/032517 A1 | 4/2004 |
| --- | --- | --- |
| WO | WO 2004/046879 A2 | 6/2004 |
| WO | WO 2004/047425 A2 | 6/2004 |
| WO | WO 2004/056121 A1 | 7/2004 |
| WO | WO 2004/057876 A1 | 7/2004 |

OTHER PUBLICATIONS

Apostolopoulos, J., et al., "Unbalanced Multiple Description Video Communication Using Path Diversity," in *Proceedings of the IEEE ICIP*, Thessaloniki, Greece, Oct. 2001, 4 pages.

Apostolopoulos, J., et al., "Modeling Path Diversity for Multiple Description Video Communication," *ICASSP* 2002, May 13-17, 2002, 4 pages.

Apostolopoulos, J., et al., "On Multiple Description Streaming with Content Delivery Networks," *IEEE INFOCOM*, Jun. 2002, 10 pages.

Apostolopoulos, J., et al., "Video Streaming: Concepts, Algorithms and Systems," Hewlett-Packard Laboratories, Palo Alto, pp. 1-35, Sep. 18, 2002.

Cosman, P.C., et al., "Vector Quantization of Image Subbands: A Survey," pp. 1-43, Sep. 14, 1995.

Gallant, M., et al., "Standard-Compliant Multiple Description Video Coding," in *Proceedings of the IEEE ICIP*, Thessaloniki, Greece, Oct. 7-10, 2001, pp. 946-949.

Goyal, V., et al., "Multiple Description Transform Coding of Images," in *Proceedings of the IEEE ICIP*, Chicago, Oct. 1998, pp. 1-5.

Goyal, V., "Beyond Traditional Transform Coding," dissertation, University of California, Berkeley, Fall 1998; pp. 1-222.

Gray, R., et al., "Quantization," *IEEE Transactions on Information Theory*, 44(6):2325-2383, Oct. 1998.

Jiang, W., et al., "A Novel Packet Loss Recovery Technique for Multimedia Communication," in *Proceedings of IEEE International Conference on Multimedia and Expo*, Piscataway, New Jersey, Aug. 22-25, 2001, pp. 1216-1219.

Kovačević, J., et al., "Multiple Descriptions—Source-Channel Coding Methods for Communications," Bell Labs, Innovation for Lucent Technologies, 1998, 14 pages.

Puri, R., et al., "Multiple Description Source Coding Through Forward Error Correction Codes," in *Proceedings of the 33rd Asilomar Conference on Signals, Systems, and Computers*, Pacific Grove, CA, Oct. 1999, 5 pages.

Puri, R., et al., "Application of FEC based Multiple Description Coding to Internet Video Streaming and Multicast," in *Proceedings of the Packet Video 2000 Workshop*, Forte Village Resort, Sardinia, Italy, May 2000, 10 pages.

Puri, R., et al., "Forward Error Correction (FEC) Codes Based Multiple Description Coding for Internet Video Streaming and Multicast," *Signal Processing: Image Communication*, 16(8):745-762, May 2001, pp. 1-18.

Servetto, S, D.,"Compression and Reliable Transmission of Digital Image and Video Signals," thesis, University of Illinois at Urbana-Champaign, 1999.

Swann, R., "MPEG-2 Video Coding for Noisy Channels," dissertation, University of Cambridge, Mar. 11, 1998 pp. i-xiii and 1-178.

Wah, B., et al., "A Survey of Error-Concealment Schemes for Real-Time Audio and Video Transmissions over the Internet," in *Proceedings of IEEE International Symposium on Multimedia Software Engineering*, Dec. 2000, 8 pages.

Wang, Y., et al., "Error Resilient Video Coding Techniques," *IEEE Signal Processing Magazine*, pp. 61-82, Jul. 2000.

Aign, S., et al., "MPEG-4 Video Transmission via DAB: Error Detection and Error Concealment," in *Proceedings of the Picture Coding Symposium No. 143*, 1997, pp. 731-736.

Bajic, I., et al., "Domain-based Multiple Description Coding of Images and Video," *IEEE Transactions of Image Processing*, 12(10):1211-1225, Oct. 2003.

Ducla-Soares, L., et al., "Error Resilience and Concealment Performance for MPEG-4 Frame-Based Video Coding," *Signal Processing: Image Communication*, 14:447-472, 1999.

Suh, J-W., et al., "Error Concealment Based on Directional Interpolation," *IEEE Transactions on Consumer Electronics*, 43(3):295-302, Aug. 1997.

Valente, S., et al., "An Efficient Error Concealment Implementation for MPEG-4 Video Streams," *IEEE Transactions on Consumer Electronics*, 47(3):568-578, Aug. 2001.

* cited by examiner

METHOD AND SYSTEM FOR MULTIPLE DESCRIPTION CODING AND COMPUTER PROGRAM PRODUCT THEREFOR

BACKGROUND OF THE INVENTION

1. Field of the Invention

The present invention relates to Multiple Description Coding (MDC) techniques.

Multiple Description Coding pursues the main goal of creating several independent bitstreams using an existing coder/decoder (codec), e.g., an existing video codec. Bitstreams can be decoded independently or jointly. The more the bitstreams decoded, the higher the quality of the output signal. Multiple Description (MD) generally includes a pre-processing stage before the encoder in order to split the input sequences (hereinafter, video sequences will be primarily referred to) and control redundancy among subsequences. It also includes a post-processing stage after the decoder, in order to merge the received and successfully decoded substreams. Multiple Description Coding greatly improves error resilience, because each bitstream can be decoded independently. Also, variable bandwidth/throughput can be managed by transmitting a suitable number of descriptions. However, coding efficiency is somewhat reduced depending on the amount of redundancy left among subsequences.

2. Description of the Related Art

FIG. 1 of the annexed drawings is generally representative of MD coding transmission when applied e.g. to image/video signals.

An input image/video signal I is subject to pre-processing by a pre-processor 10 to generate therefrom e.g. four descriptions D1 to D4. These are then passed onto an encoder 20 (of any known type) to be then "transmitted" over a channel C. This may be comprised of a transmission channel proper (e.g. for broadcast transmission) or a recording medium (e.g. tape, disc, digital memory, and so on) over which the encoded signals are written and subsequently read, also at different locations. The signals from the channel C are fed to a decoder 30 to recover multiple received descriptions D1' to D4' that are then merged in a post-processing stage 40 to recover an output image/video signal O.

Multiple Description Coding is essentially analogous to Scalable Coding (also known as Layered Coding). The main difference lies in the dependency among bitstreams. The simplest case is that of two bitstreams being created. In the case of scalable coding they are referred to as "base layer" and "enhancement layer", the latter depends on the former and cannot be decoded independently. On the other hand, in the case of multiple description coding, each description can be individually decoded to get a base quality video.

As is the case for Scalable Coding, there can be Spatial, Temporal or SNR Multiple Descriptions.

Replicated headers/syntax and replicated motion vectors among bitstreams greatly impede coding efficiency in SNR MD. Replicated headers/syntax also hinders Temporal MD, and motion compensation is less effective because of the increased temporal distance between frames. Spatial MD is hindered by headers/syntax as well. Unlike the case of Temporal MD, motion compensation is not affected, particularly when 8×8 blocks are split into smaller blocks, as in the latest H.264 codec. Because of this, Spatial MD Coding is the best choice for video coding.

The underlying video codec can be either one of the traditional solutions based on DCT transform and motion compensation (e.g. MPEG-x, H.26x), or one of the more recent codecs based on the wavelet 3D transform (e.g. SPHIT). The H.264 codec is promising because of its increased coding efficiency, which helps in compensating for the losses due to replicated headers/syntax overhead. The multimode prediction (up to 4 motion vectors per 8×8 block) is expected to assist with Spatial MD.

Multiple Description Coding has been the subject of extensive literature as witnessed, e.g., by the publications listed in the following:

P. C. Cosman, R. M. Gray, M. Vetterli, "Vector Quantization of Image Subbands: a Survey", September 1995;

Robert Swann, "MPEG-2 Video Coding over Noisy Channels", Signal Processing and Communication Lab, University of Cambridge, March 1998;

Robert M. Gray "Quantization", IEEE Transactions on Information Theory, vol. 44, n. 6, Oct. 1998, pp. 2325-2383;

Vivek K. Goyal, "Beyond Traditional Transform Coding", University of California, Berkeley, Fall 1998;

Jelena Kovačević, Vivek K. Goyal, "Multiple Descriptions—Source-Channel Coding Methods for Communications", Bell Labs, Innovation for Lucent Technologies, 1998;

Jelena Kovačević, Vivek K. Goyal, Ramon Arean, Martin Vetterli, "Multiple Description Transform Coding of Images", Proceedings of IEEE Conf. on Image Proc., Chicago, October 1998;

Sergio Daniel Servetto, "Compression and Reliable Transmission of Digital Image and Video Signals", University of Illinois at Urbana-Champaign, 1999;

Benjamin W. Wah, Xiao Su, Dong Lin, "A Survey Of Error-Concealment Schemes For Real-Time Audio And Video Transmission Over Internet", Proceedings of IEEE International Symposium on Multimedia Software Engineering, December 2000;

John Apostolopoulos, Susie Wee, "Unbalanced Multiple Description Video Communication using Path Diversity", IEEE International Conference on Image Processing (ICIP), Thessaloniki, Greece, October 2001;

John Apostolopoulos, Wai-Tian Tan, Suise Wee, Gregory W. Wornell, "Modeling Path Diversity for Multiple Description Video Communication", ICASSP, May 2002;

John Apostolopoulos, Tina Wong, Wai-Tian Tan, Susie Wee, "On Multiple Description Streaming with Content Delivery Networks", HP Labs, Palo Alto, February 2002, pp. 1 to 10;

John Apostolopoulos, Wai-Tian Tan, Susie J. Wee, "Video Streaming: Concepts, Algorithms and Systems", HP Labs, Palo Alto, September 2002;

Rohit Puri, Kang-Won Lee, Kannan Ramchandran and Vaduvur Bharghavan. Forward Error Correction (FEC) Codes Based Multiple Description Coding for Internet Video Streaming and Multicast. Signal Processing: Image Communication, Vol. 16, No. 8, pp. 745-762, May 2001;

Rohit Puri and Kannan Ramchandran. Multiple Description Source Coding Through Forward Error Correction Codes In the Proceedings of the 33rd Asilomar Conference on Signals, Systems, and Computers, Pacific Grove, Calif., October 1999; and Rohit Puri, Kang-Won Lee, Kannan Ramchandran and Vaduvur Bharghavan. Application of FEC based Multiple Description Coding to Internet Video Streaming and Multicast. Proceedings of the Packet Video 2000 Workshop, Forte Village Resort, Sardinia, Italy, May 2000.

Turning specifically to the patent literature, one may refer, by way of general background to documents WO-A-2004/057876, WO-A-2004/046879, WO-A-2004/047425, WO-A-2004/014083 and, as it more specifically regards the topics considered in the following, to documents WO-A-2003/

005676, WO-A-2003/005677, WO-A-2003/0005761, WO-A-2004/032517, and WO-A-2004/056121.

To sum up, the literature referred to in the foregoing discloses a wide gamut of coding schemes: overlapping quantization (MDSQ or MDVQ), correlated predictors, overlapped orthogonal transforms, correlating linear transforms (MDTC, e.g. PCT or pairwise correlating transform for 2 MD), correlating filter banks, interleaved spatial-temporal sampling (e.g. video redundancy coding in H.263/H.263+), spatial-temporal polyphase downsampling (PDMD, see below), domain based partitioning (in the signal domain or in a transform domain), FEC based MDC (e.g. using Reed-Solomon codes).

A simple scheme for SNR (Signal-to-Noise Ratio) MD is coding of independent video flows created by means of MD quantizers, either scalar or vector (MDSQ, MDVQ). The structure of the MD quantizer controls redundancy.

A simple scheme for Spatial/Temporal MD is coding of independent video flows created by means of Spatial or Temporal Polyphase Downsampling (PDMD). A programmable Spatial or Temporal low-pass filter controls redundancy.

As an example, Temporal MD can be achieved by separating odd and even frames, creating 2 subsequences. Alternatively odd and even fields can be separated. Spatial MD is achieved by separating pixels of 2×1 blocks, so that 2 subsequences are created. Alternatively, four subsequences can be created by separating pixels in 2×2 blocks. The two techniques can be combined. Please note, unlike Temporal MD, Spatial MD employs careful processing to avoid color artifacts caused by downsampled chroma formats and field interlacing. Each subsequence is then fed into a standard video encoder.

Another area of interest in encoding/decoding digital signals that will be referred to in the following is represented by error concealment techniques. These are again the subject matter of extensive literature, related to both audio and/or video signals as witnessed e.g. by WO-A-97/015888, WO-A-2003/061284, WO-A-2003/019939, WO-A-2003/017255, WO-A-2003/017555, WO-A-2002/033694, WO-A-2001/095512, WO-A-2001/089228, WO-A-2000/027129.

BRIEF SUMMARY OF THE INVENTION

One embodiment of the present document provides an improved technique that further exploits the error resilience due to redundancy of multiple description bitstreams.

One embodiment of the present invention is directed to a method of processing digital signals that includes: converting the digital signals between a first format and a second format that conveys multiple descriptions of the digital signals; and subjecting the digital signals to an error concealment process. Subjecting the data signals to the error concealment process preferably takes place in converting the digital signals from the second format conveying multiple descriptions to the first format. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

One concept underlying one embodiment of the present invention is that multiple description coding (MDC) and concealment techniques can be used jointly, the resulting combination giving rise to unexpectedly improved effects in terms of quality and resilience to errors. This applies also to the case where the associated underlying decoders (or encoders) are of a type that is not particularly robust in respect of errors/erasures.

One embodiment of the invention includes a decoupled pre-processor, i.e. a processing stage operating before the video decoders and modifying the input thereto.

One embodiment of the invention includes a decoupled post-processor, i.e. a processing stage operating after the video decoders and modifying their output; in this case, the underlying video decoders should preferably be capable of signaling errors in order to ease the post-processor task. Concerning decoupled concealment techniques, one may refer to European Patent Application No. 04006490.9, which is incorporated herein by reference in its entirety;

One embodiment of the invention includes decoupled pre- and post-processors, i.e. processor stages arranged before and after the video decoders and modifying their input and output. In this case, the decoders need not signal errors to the post processors (these pre- and post-processors may in fact also be coupled, thereby making it unnecessary for the decoders to indicate the errors to the post-processor).

One embodiment of the invention includes a coupled post-processor, i.e. a processing stage operating after video decoders, modifying their output and communicating with decoders. The underlying video decoders could be modified to communicate with the post-processor (in that respect, one may also refer to European Patent Application No. 04006491.7, which is incorporated herein by reference in its entirety.

One embodiment of the invention includes coupled pre- and post-processors, i.e. processing stages operating before and after the video decoders, modifying their input and output and communicating with decoders.

All the aforementioned methods can be applied to the case of PDMD of filtered data. In particular, the method can be applied when multiple description coding is used.

Additionally, while video signals have been referred to for immediate reference, those of skill in the art will promptly appreciate that the arrangements described apply in general to multiple description coding of any digital signals, independently of their nature (audio, video, data).

BRIEF DESCRIPTION OF THE SEVERAL VIEWS OF THE DRAWINGS

The invention will now be described, by way of example only, with reference to the enclosed figures of drawing, wherein.

DETAILED DESCRIPTION OF THE INVENTION

While the description that follows will be given by referring primarily to video signals, it will be appreciated that the same reasoning can be applied e.g. to audio signals. Again, those of skill in the art will promptly appreciate that the arrangements described apply in general to multiple description coding of any digital signals, independently of their nature (audio, video, data).

In brief, the first, third and fifth arrangements described herein are mainly characterized by the techniques that allows concealment of errors/erasures in the pre-processing stage before decoding takes place. These methods can be combined with the techniques described in European Patent Application No. 04015819.8, which is incorporated herein by reference in its entirety. The second arrangement described herein is a sort of extension of the decoupled concealment techniques illustrated in European Patent Application No. 04006490.9, already mentioned in the foregoing. The fourth arrangement described is in turn an extension of joint MD decoding as illustrated in European Patent Application No. 04006491.7, again already mentioned in the foregoing.

Figure 1:
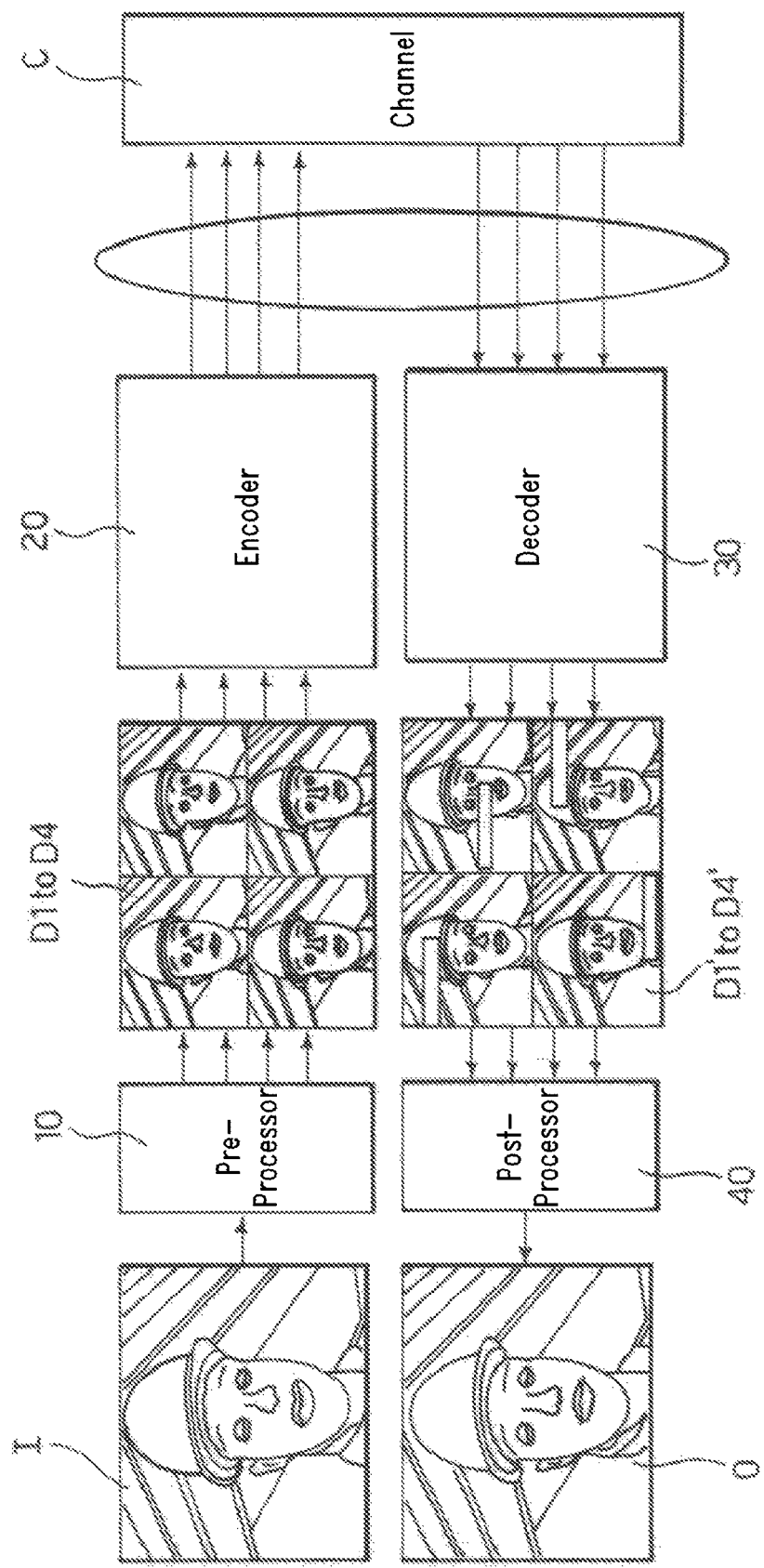
FIG. 1 schematically shows a prior art MD coding transmission system applied e.g. to image/video signals
Figure 2:
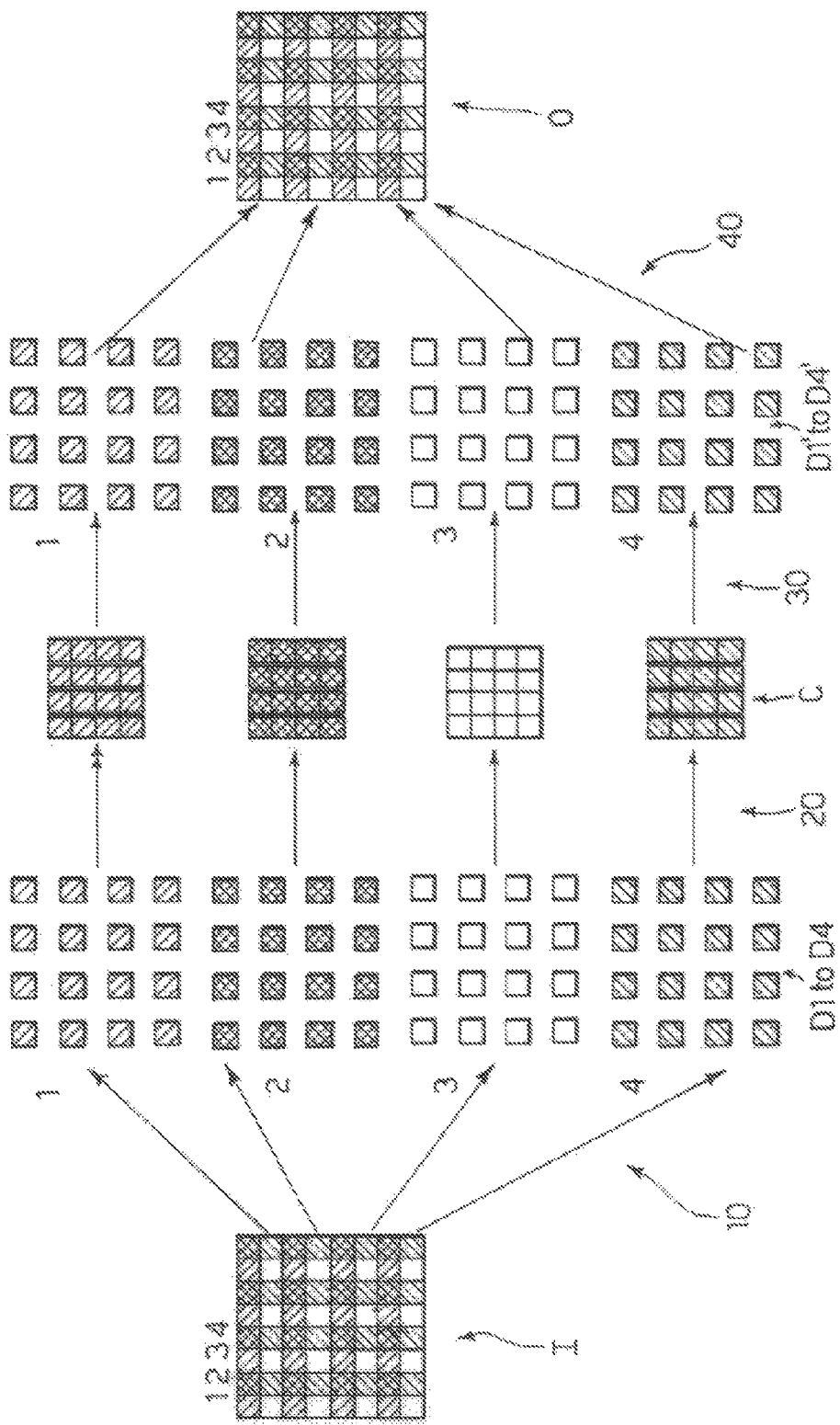
FIGS. 2 to 4 are exemplary of alternative representations of the same basic concepts outlined in FIG. 1, FIGS. 5 to 11 are functional block diagrams exemplary various kinds of processing that may be performed in an arrangement as described herein.

By way of further explanation of some basic concepts that are otherwise known to those of skill in the art, FIG. 2 shows a typical context of use of multiple description (MD) coding. In FIG. 2 the same references already appearing in FIG. 1 have been used to designate the original image I, the multiple descriptions D1 to D4 derived therefrom, the channel C, the multiple descriptions D1' to D4' received from the channel and the output image O. References 10, 20, 30, and 40 thus indicate pre-processing prior to encoding, the encoding process, the decoding process and post-processing after decoding, respectively.

Figure 3:
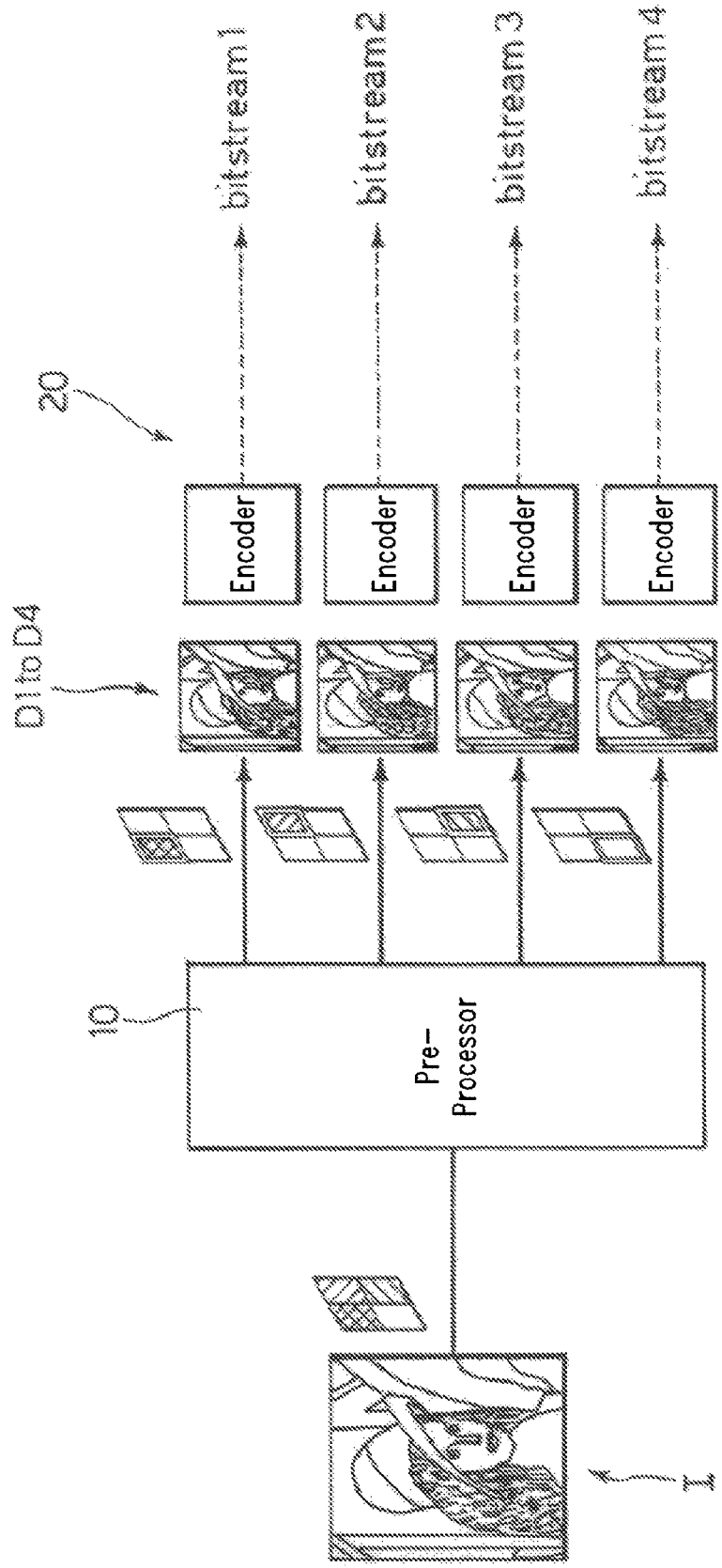

By referring to that context, FIG. 3 is an exemplary sketch of how MD encoding can be applied in order to take the information items (e.g. pixels) of an original image I and produce therefrom, via a "MD-split" pre-processing module 10 the multiple descriptions D1 to D4. These are then sent to one or more encoders 20 to produce respective data flows (designated bitstream1, bitstream2, bitstream3, bitstream4) that convey the respective information over the channel C.

Figure 4:
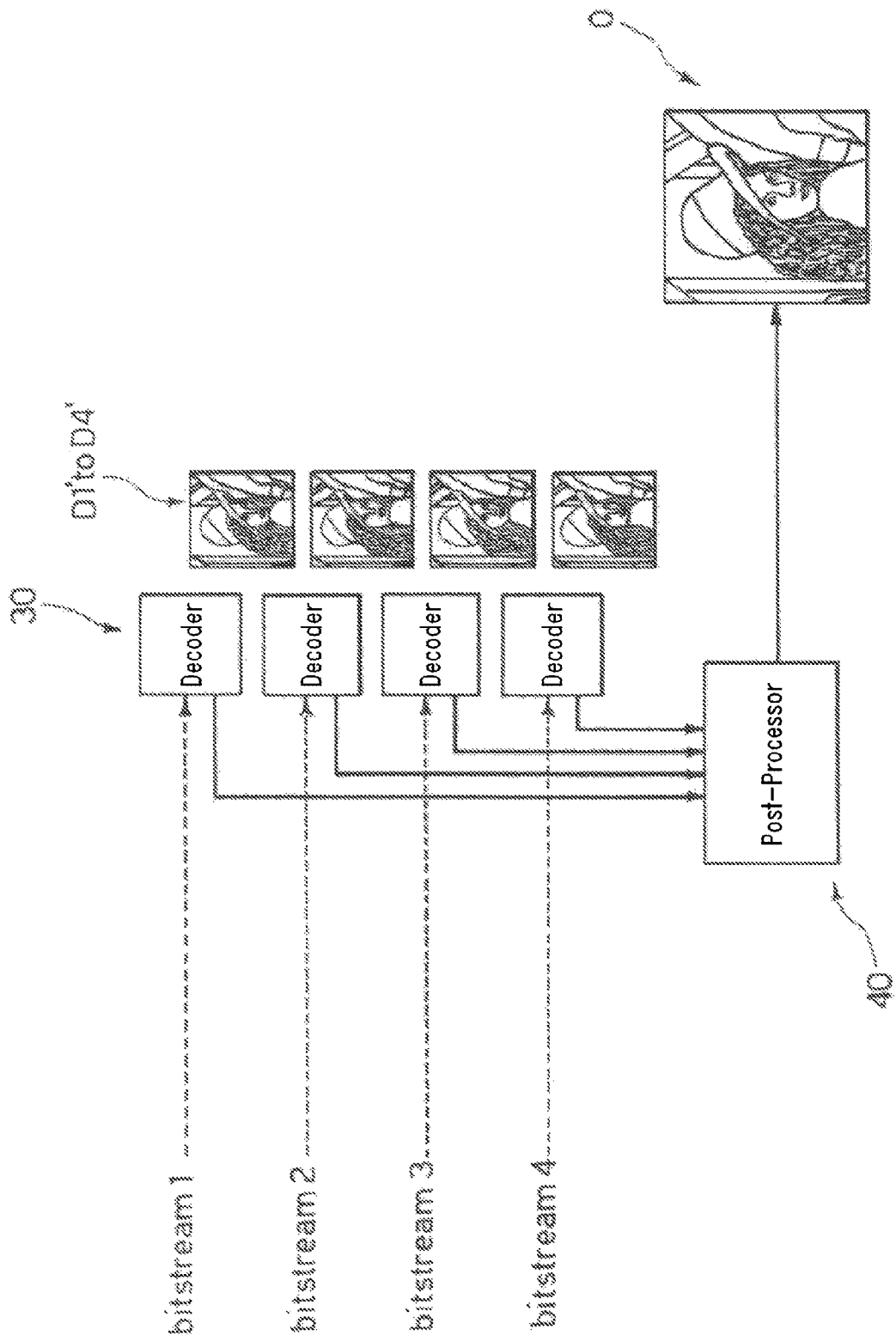

In a thoroughly symmetrical way, FIG. 4 is an exemplary sketch of how MD decoding can be applied in order to take the data flows (bitstream1, bitstream2, bitstream3, bitstream4) and feed them to one or more decoders 30 to obtain the multiple descriptions D1' to D4'. These are then subject to a "MD-merge" operation in a post-processing module 40 to produce therefrom the received image O.

Quite obviously, referring the four descriptions/bitstreams is of purely exemplary value in that such descriptions/bitstreams may be any number.

The exemplary embodiments shown in the block diagrams of FIGS. 5 to 11 essentially refer to error/erasure concealment techniques adapted to be applied "upstream" (pre-processing) and/or "downstream" (post-processing) of the decoder(s) 30 in order to conceal the negative effects of packet loss PL occurring in the data flows bitstream1, bitstream2, bitstream3, and bitstream4 as a result of transmission/recording/storage on the "channel" C.

By way of general introduction, the exemplary embodiments shown in the block diagrams of FIGS. 5 to 11 will now be briefly described. This also with the aim of simplifying the subsequent portions of this detailed description by making it unnecessary to repeat the description of certain blocks and functions.

In that respect, it will be appreciated that the same references have been used in the block diagrams of FIGS. 5 to 11 to designate parts or elements identical or equivalent to those indicated with the corresponding references in FIGS. 1 to 4.

Figure 5:
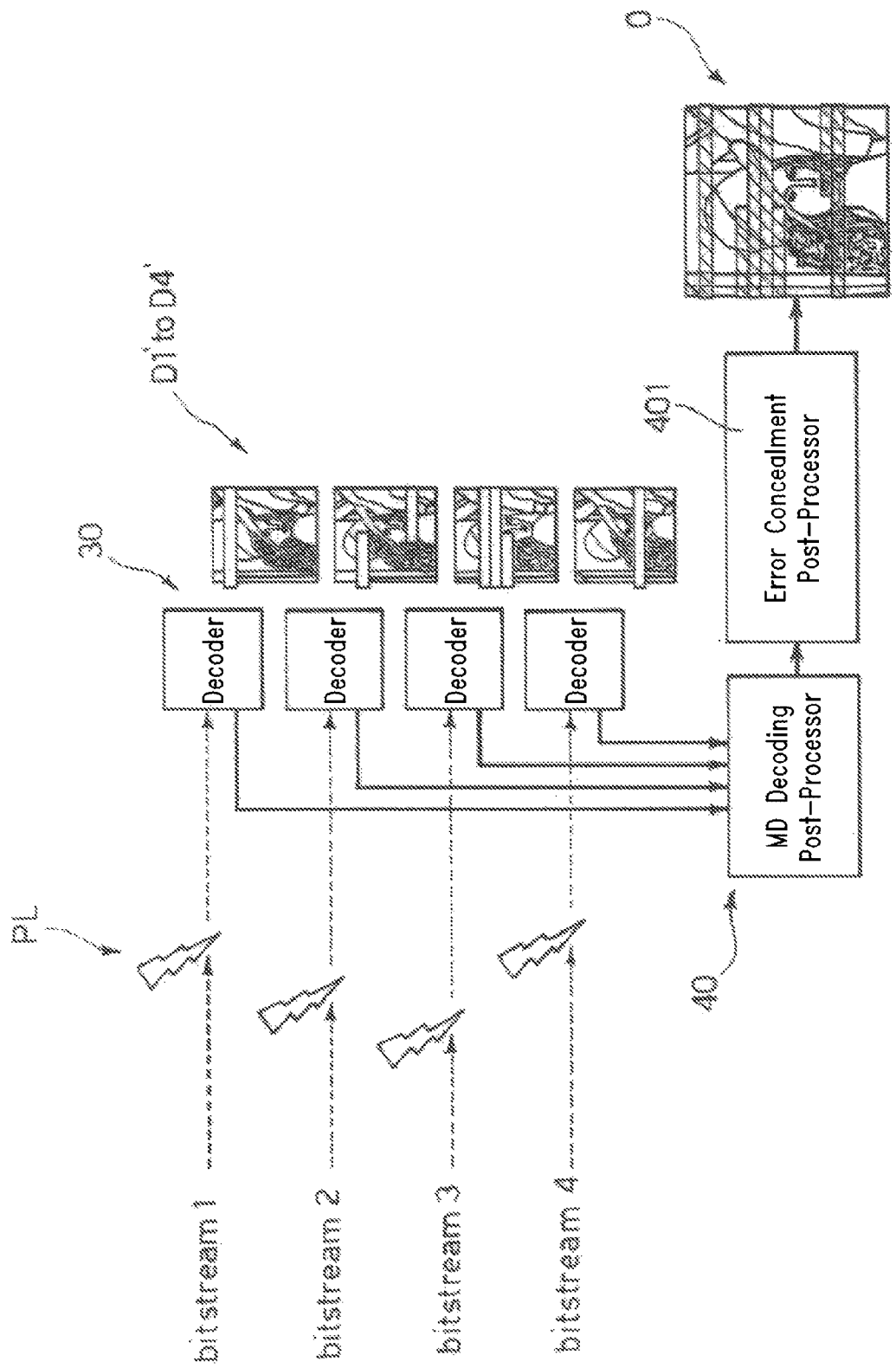

The block diagram of FIG. 5 refers to an arrangement where the MD decoding (MD-merge) block 40 is followed by a de-coupled processor 401A for error concealment. The post-processor 401 being "de-coupled" means that the post-processor 401A does not communicate with the decoder(s) 30, which may lead to some error propagation effects. Since the bitstreams are corrupted, the decoder(s) are of a robust type, i.e. they are in position to proceed with decoding without blocking.

Figure 6:
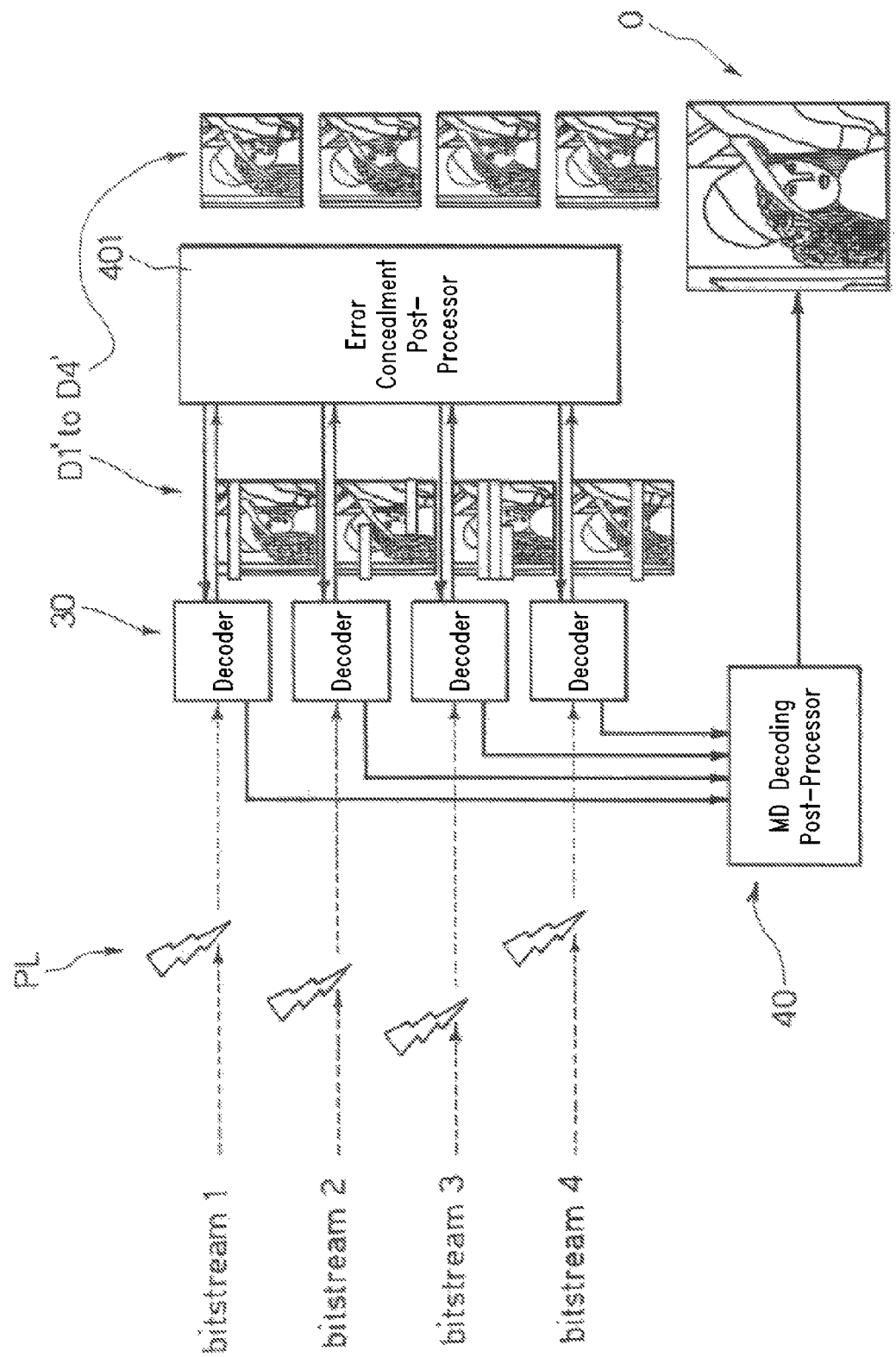

The block diagram of FIG. 6 refers to an arrangement where a post-processor 401B is coupled to the decoders 30. As a consequence, each decoder 30 may take advantage of the information decoded by the other decoders. Errors are thus better concealed, and error propagation is reduced.

Figure 7:
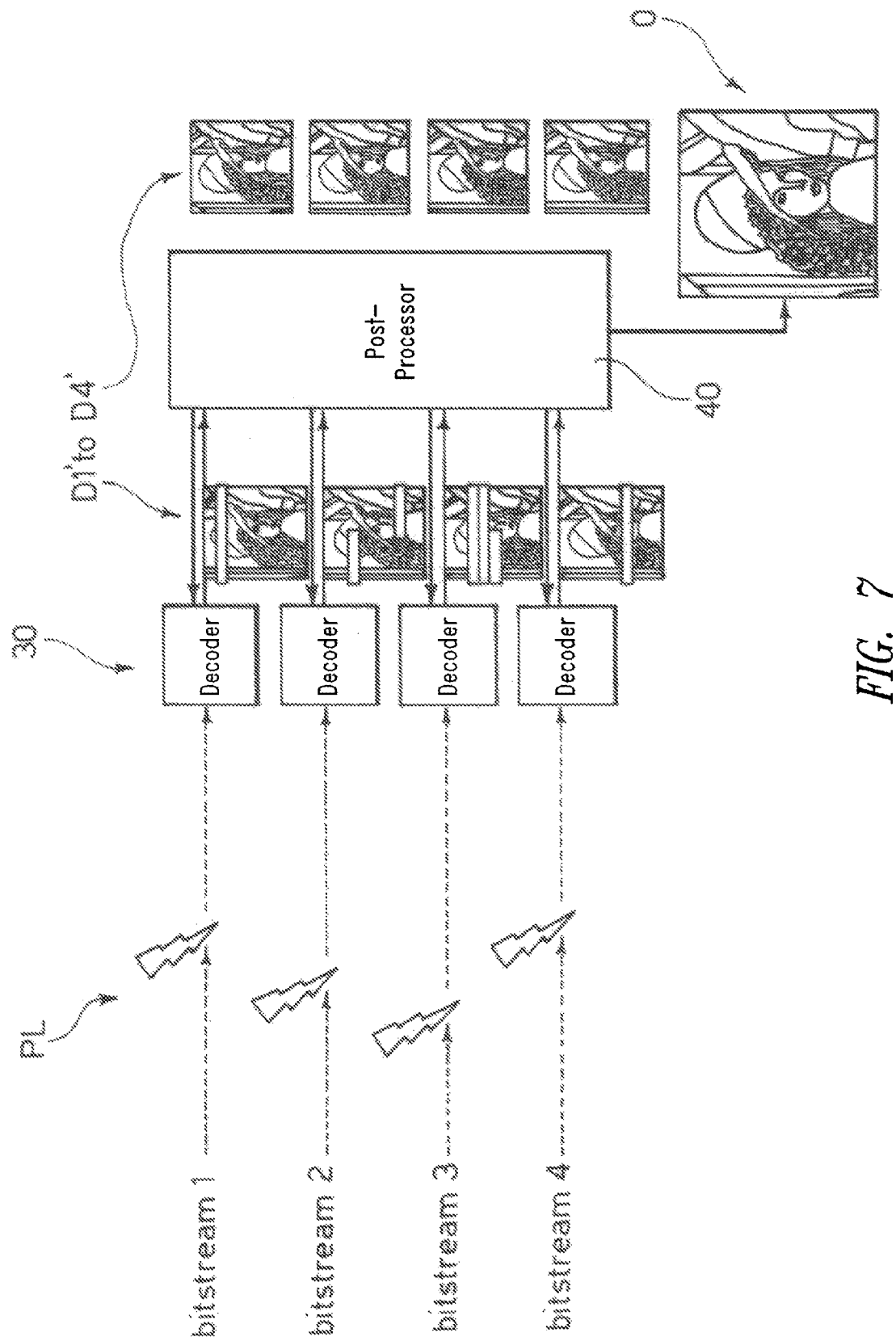

The block diagram of FIG. 7 refers to an arrangement essentially similar to the arrangement of FIG. 6, where, however, a post-processor 401C includes the error concealment module 401B incorporated with the merge module 40. Consequently, in addition to concealing errors, it also merges the various descriptions and reorders the frames. The decoding order of the descriptions D1' to D4' is thus different from the display order.

Figure 8:
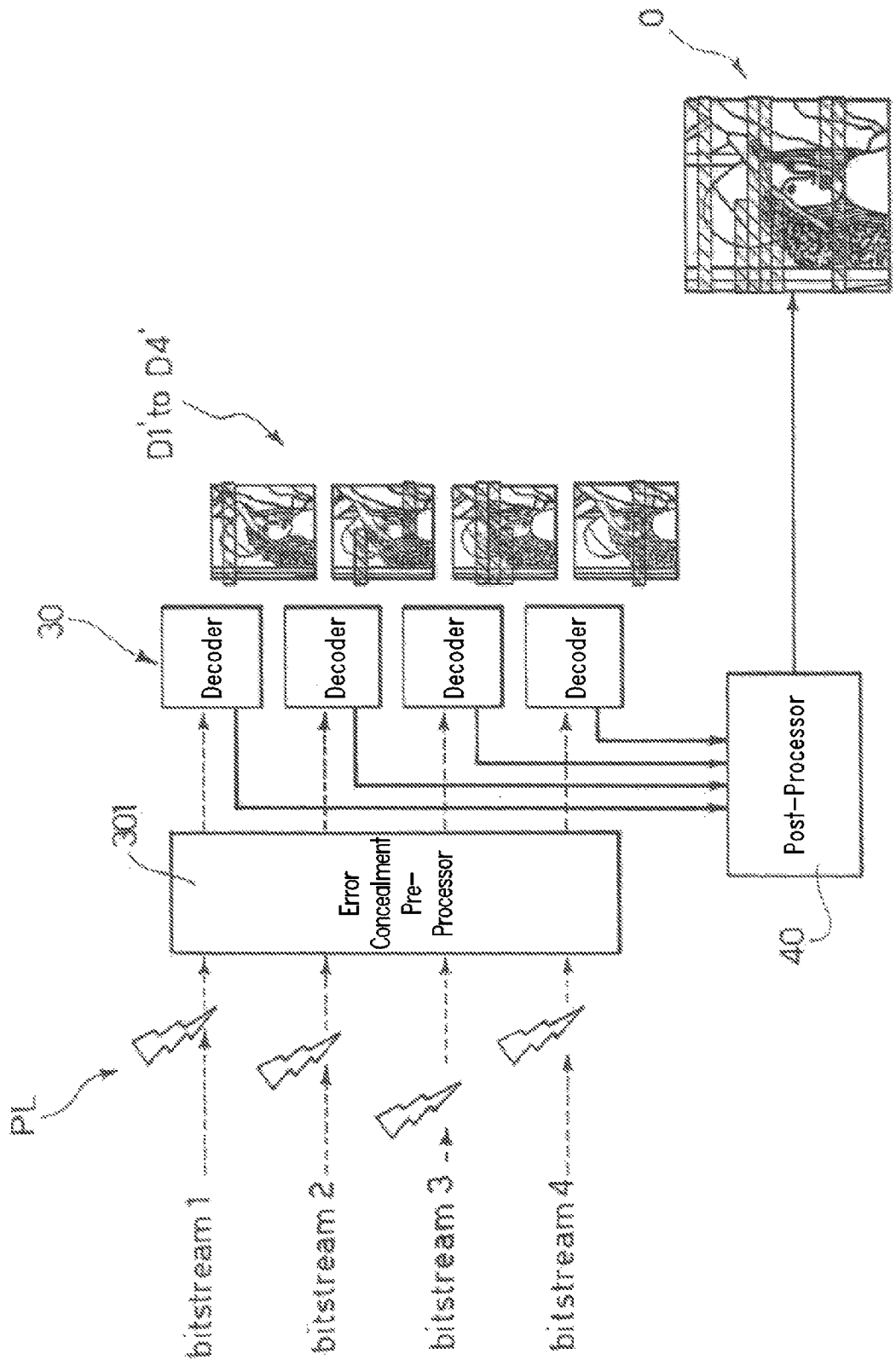

In the block diagram of FIG. 8, a pre-processor 301 for error concealment precedes the decoder(s) 30. Error concealment carried out upstream makes it possible to use non-robust decoders 30. Since the decoders 30 do not communicate with one another via the de-coupled pre-processor 301, some error propagation effects may arise.

Figure 9:
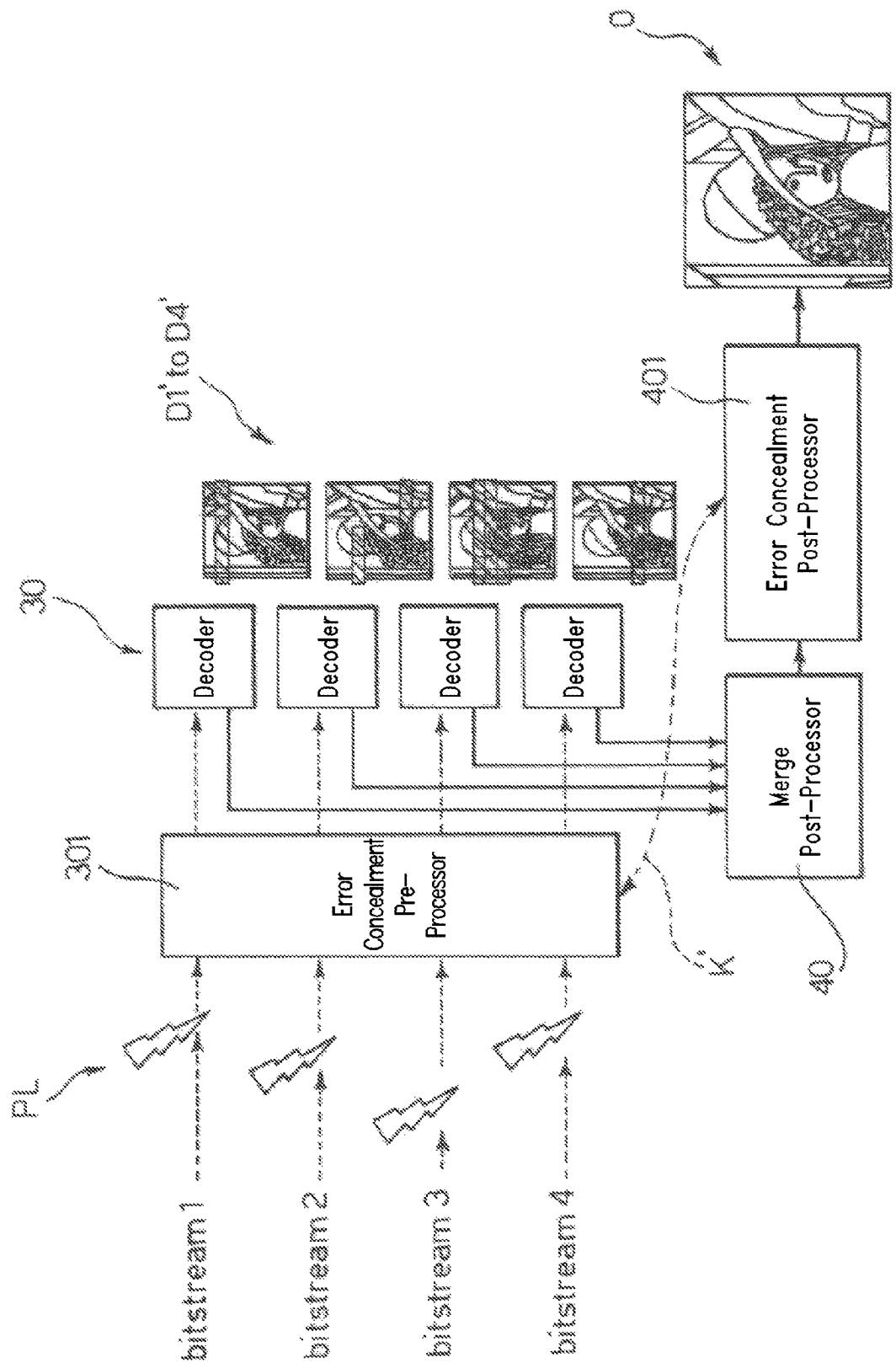

The block diagram of FIG. 9 includes both a pre-processor 301 upstream of the decoders 30 and a post-processor 401A downstream of the MD-merge module 40. The two processors 301 and 401A may communicate as shown by the dotted line K to coordinate the error concealment actions they perform.

Figure 10:
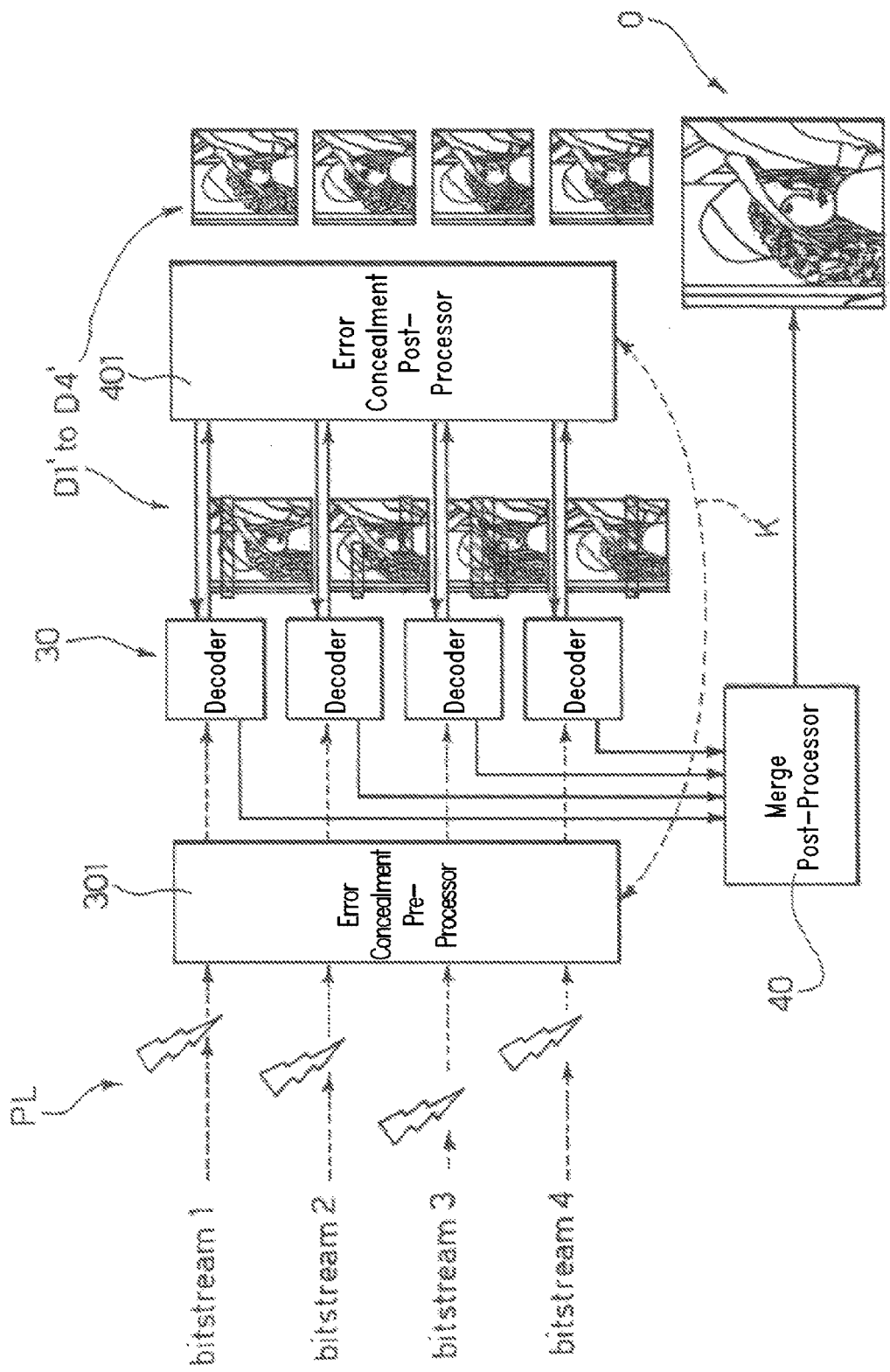

The arrangement shown in FIG. 10 shares the provision of a pre-processor 301 upstream of the decoders 30 (as is the case of the arrangements of FIGS. 8 and 9) with a (coupled) post-processor 401B (as is the case of the arrangement of FIG. 6). Again, the two processors 301 and 401B may communicate as shown by the dotted line K to coordinate the error concealment actions they perform.

Figure 11:
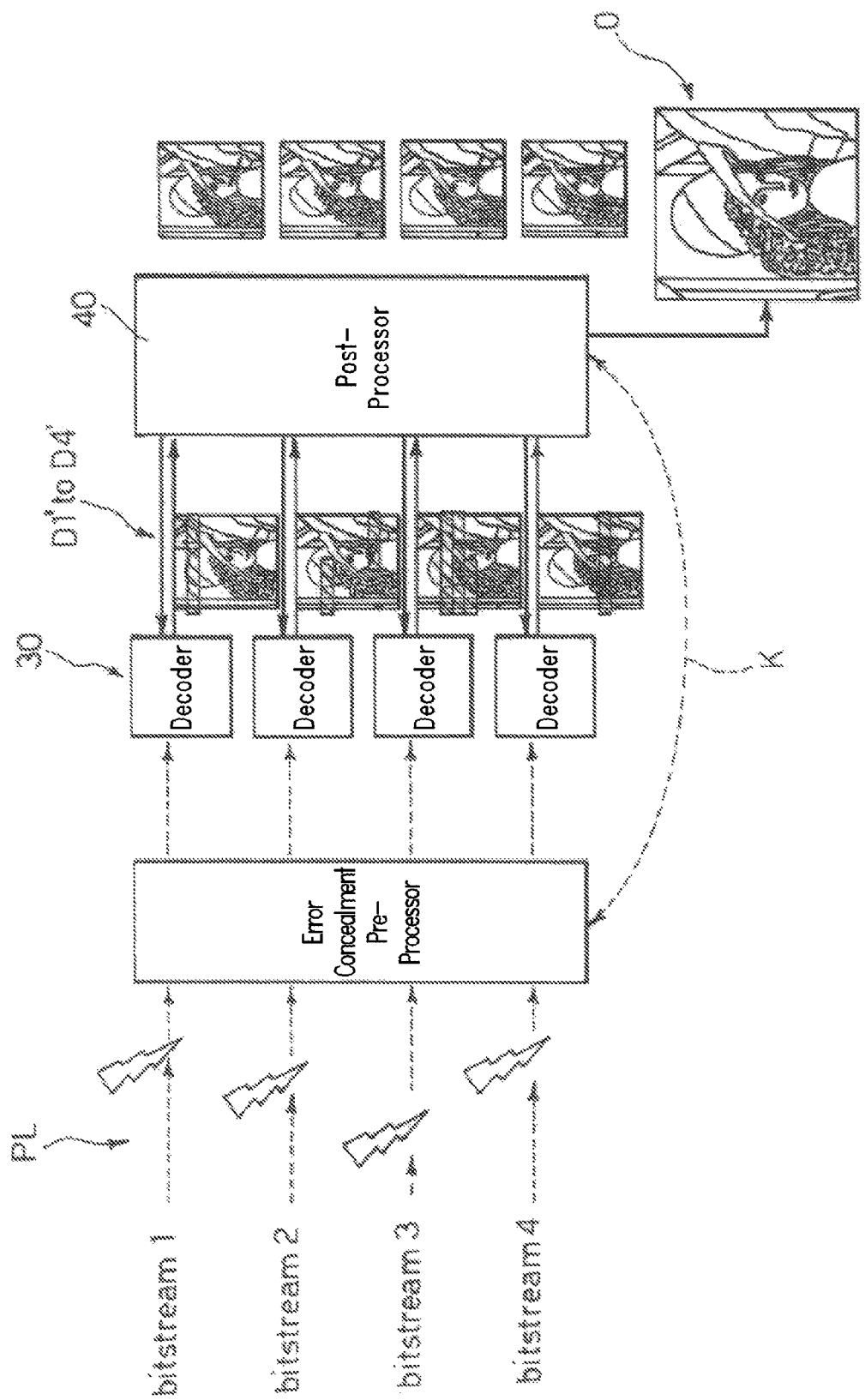

The arrangement of FIG. 11 is essentially identical to the arrangement of FIG. 10, but for the fact that (as in the arrangement of FIG. 7) the post-processor 401C includes the error concealment post-processor 401B incorporated with the merge module 40. Consequently, in addition to concealing errors, it also merges the various descriptions and reorders the frames. The decoding order of the descriptions D1' to D4' is thus different from the display order.

It will be appreciated that concealment may thus occur in the "compressed" domain, that is by acting on the bitstreams before they are decoded by the decoders 30 (as is the case e.g. of FIG. 8). The most relevant approach in that respect is thus recovery of a missing packet by copying a packet containing similar data from another stream. Creating a replacement packet "on the fly", if recovery is not possible, allows concealing the loss from the decoder.

Concealment may also take place in the pixel domain (as shown in FIG. 5), that is by acting after the MD decoding without communicating the results to the decoder 30. This may occur by signaling the errors by means of invalid combinations of the luma/chroma triplets associated with each pixel, or by resorting to an edge-driven concealment technique, this being a particularly preferred choice.

The arrangement of FIG. 9 relies on a combination of the two approaches considered in the foregoing, and takes into account how errors propagate as a consequence of the dependencies introduced by video coding. Controlling error propagation represents a key factor in proper error concealment.

The arrangements of FIGS. 6 and 7 rely again on error concealment in the pixel domain. In contrast to the arrangement of FIG. 5, the results are communicated to the decoder 30, which increases operation efficiency. Concealment can be introduced at the level of motion vectors (and not just at the pixel level), and pixel concealment may be obtained by considering not only those pixels that were received correctly, but also the information that describes motion.

The arrangements of FIGS. 10 and 11 essentially derive from a combination of the principles underlying the arrangements of FIGS. 6, 7, and 8 based on the rationale of the arrangement of FIG. 9.

A first exemplary embodiment of a coupled pre-processor for error/erasure concealment will now be described in greater detail.

The key idea is to fill gaps in bitstreams before the decoding process 30 starts. Gaps are due to errors or erasures which cause the loss of data packets. Gaps are filled by copying data packets taken from other bitstreams and containing the same data as lost or erroneous packets. Alternatively, gaps are filled by decoding packets taken from other bitstreams and containing the same data, then re-encoding on-the-fly replacement packets. Re-encoded replacement packets, when decoded, can yield an effect equal or similar to concealment techniques that can be implemented in robust decoders.

If errors and erasures are not too many, the pre-processor will be able to completely fill the gaps. This permits the use of decoders with "weak" robustness to errors and erasures. Weak robustness means that decoders should be prepared to detect and conceal some sparse packet, not many consecutive packets.

Also, it can be understood that fake replacement packets can be created on-the-fly. This permits the use of decoders with no robustness to errors and erasures. Fake replacement packets can be created so that, when decoded, their effect is equal or similar to concealment techniques that are implemented in robust decoders.

By way of non-limiting example, a fake replacement packet can be created in such a way that the decoder sets to zero the corresponding image area. This is a method for highlighting the gap, which may be useful for the post-processor.

Another non-limiting example provides for creating the fake packet in such a way that the decoder sets to a given value (e.g. the average value 128) the luminance/chrominance of the video signal, which corresponds to one of the easiest forms of error concealment possibly performed.

Further, more sophisticated examples are described in the following.

The process of identification of replacement candidates based on sequence number (SN) will now be described.

Replacement candidates can be easily identified if data packets are created so that packets having the same sequence number (SN) carry information for the same portion of the same frame. As an example, this is the case when the H.264 encoder is used, specifying that each packet carry information for a fixed number MB of MacroBlocks (a macroblock correspond to 16×16 pixels): there is a fixed number P of packets per frame. Given the SN of the missing/erroneous packet, it is possible to compute the number of affected frames (frame number=SN/P), the number of the first missing/erroneous macroblock in that frame ($1^{st}$ MB number=MB*remainder of SN/P), the number of the last missing/erroneous macroblock in that frame (last MB number=$1^{st}$ MB number+MB).

Alternatively, replacement candidates may be identified based on criteria different from the sequence number (SN). For instance, replacement candidates may be identified by examining the previous and following data packets in the same bitstream containing the missing/erroneous packets and data packets in other bitstreams. The corresponding process can be described as follows:

the previous packets in the same bitstream carry information for a given portion (last MB number: MB1) of a given frame (frame number: F1);

the following packets in the same bitstream carry information for a given portion ($1^{st}$ MB number: MB2)) of a given frame (F2);

the gap is what is missing: from macroblock number MB1 in frame F1 to macroblock number MB2 in frame F2, those macroblock excluded;

the packets in other bitstream are (partially) decoded to identify what portion of what frame is the one to which the information they carry relates;

the replacement packets are selected from other bitstreams than those containing what is missing; and replacement takes place.

In the following paragraphs several cases for replacement are discussed.

1 Missing Packet: 1 Replacement Packet

In the simplest case, every missing/erroneous packet can be replaced by copying one replacement packet. This can be done when a replacement packet can be found that contains the same information carried by the missing/erroneous packet.

If the sequence number of the replacement packet is different than that of the missing/erroneous packet, it is modified after copying and before pasting it into the corrupted bitstream. The sequence number of the replacement is equal to that of the missing/erroneous packet.

1 Missing Packet: N Replacement Packets

In another case, the information carried by the missing/erroneous packet is contained in several packets in other bitstreams. Therefore all those packets are copied as a replacement for the missing/erroneous packet.

If the sequence number of the first replacement packet in the group is different than that of the missing/erroneous packet, all sequence numbers of copied packets must be modified after copying and before pasting them into the corrupted bitstream. The sequence number of the first replacement packet in the group is equal to that of the missing/erroneous packet. The sequence number of subsequent packets in the group is set to monotonically increasing values as expected by the receiver. The increase is typically +1. The sequence number of packets following the missing/erroneous packet in the corrupted bitstream is corrected by adding an offset. The first packet following the missing/erroneous packet has a sequence number equal to that of the last packet in the group plus the increment expected by the receiver.

1 Missing Packet, M Neighboring Packets: N Replacement Packets

In this case, it is not possible to find a set of N replacement packets that carry the same information as the missing/erroneous packet. However, it may be possible to find a set of N replacement packets that carry the same information as M neighboring packets plus the missing/erroneous packet. When this happens, the missing/erroneous packet cannot be replaced by itself. Instead it is possible to drop the M neighboring packets and fill the gap of M+1 packets (M dropped+1 missing/erroneous) by copying the N replacement packets.

The sequence number is managed as explained in the previous paragraph.

1 Missing Packet: 1 Replacement Packet Encoded on-the-Fly

In this case, it is not possible to find a replacement packet, nor to find a set of N replacement packets for the missing/erroneous packet. Also it is not possible to find a set of N replacement packets for the missing/erroneous packet plus M neighboring packets.

In this case, N packets containing at least the information carried by the missing/erroneous packet can be found in other bitstreams. They are decoded. The information carried by the missing/erroneous packet is separated and encoded on-the-fly. The encoded packet is then used as a replacement packet. Its sequence number is the same as the sequence number of the missing/erroneous packet.

1 Missing Packet: 1 Fake Replacement Packet

In this case, it is not possible to find a replacement packet, nor to find a set of N replacement packets for the missing/erroneous packet. Additionally, it is not possible to find a set of N replacement packets for the missing/erroneous packet plus M neighboring packets. Similarly, it is not possible to find in other bitstreams a set of N packets containing at least the information carried by the missing/erroneous packet.

In this case, a fake replacement packet can be created on-the-fly and copied into the corrupted bitstream. The sequence number is set so that it is equal to that of the missing/erroneous packet.

The fake replacement packet serves the purpose of filling the gap so that the decoder does not see any gap in the corrupted bitstream. It can carry any information as long as it refers to the same portion of the same frame of the missing/erroneous packet.

As an example, the fake replacement packet can specify that the portion of the frame contains gray pixels (average gray: Y=128, Cb=Cr=128). Alternatively it can specify blank pixels (Y=Cb=Cr=0) which can be easily identified and concealed in a post-processing stage (see below the paragraph "Indirect signalling by using invalid color triplets").

A more sophisticated example is when the fake replacement packet can specify that the portion of the frame contains the same information as the same portion of the previous frame. This information can be computed by decoding corresponding packets available in the corrupted bitstream or in other bitstreams.

The fake replacement packet can thus make the decoder behave as if a concealment policy has been implemented ('copy previous' in the last sophisticated example).

1 Missing Packet not Self-Contained. M Discarded Packets: N Replacement Packets

In this case, the missing/erroneous packet is not decodable/usable by itself, i.e. it is "not self-contained". Its loss causes M neighboring packets to be discarded because undecodable/unusable. This happens when the missing/erroneous packet contains partial information for a given portion of a given frame. The rest of the information is contained by neighboring packets.

In this case, a replacement packet or a set of N replacement packets can be found in other bitstreams. After being copied, its or their sequence number is corrected as explained previously.

1 Missing Packet not Self-Contained, M Discarded Packets: N Replacement Packets Encoded on-the-Fly In this case, it is not possible to find a replacement packet, nor to find a set of N replacement packets for the missing/erroneous packet not self-contained and for the neighboring related packets.

In this case, N replacement packets containing at least the information carried by the missing/erroneous packet and by the neighboring related packet can be found in other bitstreams. They are decoded. The information carried by the missing/erroneous packet and by neighboring related packets is separated and encoded on-the-fly in N replacement packets (N can be 1). The encoded packet(s) is (are) then used as a replacement packet(s). Its (their) sequence number is corrected as explained previously.

1 Missing Packet not Self-Contained, M Discarded Packets: N Fake Replacement Packets In this case, it is not possible to find a replacement packet, nor a set of N replacement packets for the missing/erroneous packet not self-contained and for the neighboring related packets. Also it is not possible to find in other bitstreams a set of N packets containing at least the information carried by the missing/erroneous packet and by the neighboring related packets.

In this case, N fake replacement packets can be created on-the-fly (N can be equal to M+1) and copied into the corrupted bitstream. The sequence number is managed as explained previously. If N=M+1, sequence numbers of fake replacement packets are set to be equal to those of M+1 replaced packets ($1^{st}$ replacement SN=$1^{st}$ replaced SN, $2^{nd}$=$2^{nd}$ replaced, and so on). If N is not equal to M+1, the SN of $1^{st}$ replacement packet is set to be equal to the SN of $1^{st}$ replace packet; SN of following replacement packets are set to be monotonically increasing as expected by the receiver. The sequence number of packets following the gap in the corrupted bitstream is corrected by adding an offset. The $1^{st}$ packet following the missing/erroneous packet must have a sequence number equal to that of the last replacement packet plus the increment expected by the receiver.

An example is the following: 1 missing packet: 1 replacement packet identified by the Sequence Number and copied.

Four multiple descriptions can be generated by spatial subsampling of 2×2 pixel blocks in the original sequence. If the original sequence has CIF resolution (352×288 pixels), each description has QCIF resolution (¼ of a CIF, 176×144 pixels). Each description can be compressed independently using a state-of-the art video codec. If data packets are to be copied among bitstreams (to fill gaps) based on their sequence number (SN), suitable encoding parameters are chosen, they are identical for each description.

Using the latest codec, H.264, these parameters are: number of macroblocks per slice and bitstream format. Selecting 11 MBs/slice and RTP format, each QCIF subframe is compressed into 9 data packets (176/16×144/16/11=9, 1 packet=1 row of MBs). Loosing one packet in a given bitstream, means loosing a row of macroblock of a QCIF subframe.

This loss can be concealed with some difficulty by the decoder using sophisticated spatial/temporal techniques.

Alternatively, the loss can be concealed effectively when successfully decoded descriptions are merged (details of this process are provided European Patent applications 0404006490.9 and 04006491.7 already cited in the foregoing).

As a further, improved alternative, the loss can be effectively concealed prior to decoding: lost packets may be recovered by copying corresponding data packets in other bitstream. If the Nth data packet is lost in one bitstream, it can be recovered by copying the Nth data packets from another bitstream. This can be done because data packets carry similar information, i.e. information relative to the same portion of the same frame.

If the Nth data packet is available in a set of more than one other bitstream, the choice can be made within the set either at random or by taking the bitstream with the higher/highest quality in the set (e.g. when unbalanced multiple description coding has been used) or by following a pre-defined preference list (e.g. copy the missing packet from $4^{th}$ bitstream first, otherwise from the $3^{rd}$ on so on . . . ).

The process of selecting the optimal replacement candidates will now be described more in detail.

Specifically the case will be considered of three out of four descriptions created by spatial subsampling of 2×2 pixel block. Those descriptions will be characterized by aliasing due to subsampling; the fourth description can be created by subsampling lowpass filtered pixels. This $4^{th}$ description will be free of the aliasing due to subsampling and will therefore have a higher visual quality. This is the description that should be selected as a source for replacement packets: this description will generally be more heavily protected in case prioritized transmission are offered by the network.

If a 2×2 lowpass kernel is used, the encoding matrix is:

$$\vec{d} = M\vec{p} \Leftrightarrow \begin{bmatrix} d_1 \\ d_2 \\ d_3 \\ d_4 \end{bmatrix} = \begin{bmatrix} 1 & 0 & 0 & 0 \\ 0 & 1 & 0 & 0 \\ 0 & 0 & 1 & 0 \\ 1/4 & 1/4 & 1/4 & 1/4 \end{bmatrix} \begin{bmatrix} p_1 \\ p_2 \\ p_3 \\ p_4 \end{bmatrix}.$$

Alternatively, if a 3×3 lowpass kernel is used, the encoding matrix is:

$$\vec{d} = M\vec{p} \Leftrightarrow \begin{bmatrix} d_1 \\ d_2 \\ d_3 \\ d_4 \end{bmatrix} = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 0 & 1 & 0 & 0 & 0 & 0 & 0 \\ 1/16 & 1/8 & 1/16 & 1/8 & 1/4 & 1/8 & 1/16 & 1/8 & 1/16 \end{bmatrix} \begin{bmatrix} p_1 \\ p_2 \\ p_3 \\ p_4 \\ p_5 \\ p_6 \\ p_7 \\ p_8 \\ p_9 \end{bmatrix}.$$

As another example a case may be considered where the $1^{st}$ description is created by subsampling, the $2^{nd}$ and the $3^{rd}$ by subsampling lowpass filtered pixels so that horizontal or vertical alias are eliminated, the $4^{th}$ by subsampling lowpass filtered pixels so that both horizontal and vertical alias are eliminated. In case replacement packets are needed, they should be selected from description 4, then from description 2 or 3, then (last replacement source) from description 1.

Using 2×2 filter kernels, the four descriptions can be created as follows:

$$\vec{d} = M\vec{p} \Leftrightarrow \begin{bmatrix} d_1 \\ d_2 \\ d_3 \\ d_4 \end{bmatrix} = \begin{bmatrix} 1 & 0 & 0 & 0 \\ 1/2 & 1/2 & 0 & 0 \\ 1/2 & 0 & 1/2 & 0 \\ 1/4 & 1/4 & 1/4 & 1/4 \end{bmatrix} \begin{bmatrix} p_1 \\ p_2 \\ p_3 \\ p_4 \end{bmatrix}.$$

Using 3×3 filter kernels:

$$\vec{d} = M\vec{p} \Leftrightarrow \begin{bmatrix} d_1 \\ d_2 \\ d_3 \\ d_4 \end{bmatrix} = \begin{bmatrix} 1 & 0 & 0 & 0 & 0 & 0 & 0 & 0 & 0 \\ 1/4 & 1/2 & 1/4 & 0 & 0 & 0 & 0 & 0 & 0 \\ 1/4 & 0 & 0 & 1/2 & 0 & 0 & 1/4 & 0 & 0 \\ 1/16 & 1/8 & 1/16 & 1/8 & 1/4 & 1/8 & 1/16 & 1/8 & 1/16 \end{bmatrix} \begin{bmatrix} p_1 \\ p_2 \\ p_3 \\ p_4 \\ p_5 \\ p_6 \\ p_7 \\ p_8 \\ p_9 \end{bmatrix}.$$

One of the advantages of the exemplary arrangement shown lies in that, if the gaps are completely filled, decoders do not see losses. Therefore they are not required to be robust to losses. They do not have to detect and conceal the loss. Their implementation can be simplified.

Since packets carry similar but not equal information, when gaps are filled by copying data packets, there can be some drift in the decoded subsequence. In fact, there will be a mismatch in the prediction loop.

Other factors to take into account are the "type" of replacement packets and the "state" of the decoder. In fact there are other parameters to be set, such as: Intra rate and number of B pictures. They define the GOP (group of pictures) structure. E.g. using I12B2 the following regular GOPs results: IbbPbbPbbPbb IbbPbbPbbPbb .... If these parameters are set to the same values for all encoders, packets having the same SN will correspond to a given portion of a given frame with the same type (I, P or B).

This means that packets with the same sequence number, in addition to containing information for the same portion of the same frame, also contain the same type of information. If they correspond to I-frames, they contain information for pixels. If they correspond to P-frames, they contain information for prediction error on pixels and one set of motion vectors. If they correspond to B-frames, they contain information for prediction error on pixels and two set of motion vectors.

Another advantage lies in that this kind of pre-processing is a concealment technique that recovers all the lost information without using any specific technique. Usually pixels have to be recovered using adaptive spatial or temporal averaging; motion vectors have to be recovered using median filtering; and so on. Conversely, in the arrangement described herein, the same technique (copying data) conceals exactly what is lost (pixel, motion vectors, etc. . . . i.e. whatever is contained in the lost data packet).

This is very useful in a more general perspective. In fact:

no need exists of using a robust decoder;

no need exists of implementing several sophisticated (and sometimes not very effective) concealment techniques;

the syntax of the bitstream is implicitly recovered the decoder state evolves in the right way, even if there can be some drift depending on the amount of prediction used.

The decoder state is a topic worth being discussed more in detail here.

Suppose a data packet containing an anchor frame has been lost. Concealing the missing pixels is needed to output the frame. However, this will not suffice in that, if the anchor frame had been received, it would have been decoded and then copied to the frame buffer. This "update" of the frame buffer can be seen as a modification of the decoder state.

This is in fact what is mostly missing when standard concealment techniques are used: standard techniques conceal the pixels but do not let the decoder evolve in the right state. Conversely, the technique described causes the decoder to evolve to the correct state. This happens because the data packet is replaced by a similar data packet.

A more complex implementation, involving on-the-fly re-encoding of replacement packets, will now be discussed.

In fact, while copying missing/corrupted data packets is the simplest technique in the pre-processing stage, other, more sophisticated techniques can be used. If more than one packet is available for replacing the missing packet, the available packets can be decoded, the decoded information can be merged (averaging pixels, taking the median of motion vectors, and so on), and a suitable packet can be encoded on-the-fly as a replacement.

On-the-fly encoding of a suitable packet is helpful in case corresponding data packets do not carry similar information. This may happen if encoding parameters differs among bitstreams.

As an example of packet replacement involving re-encoding on-the-fly, one may consider the case (considered also in European Patent Application 04006491.7) where intra pictures are offset, i.e. the intra refresh policy is synchronized so that it is possible to guarantee that at least one description has been recently refreshed for every frame.

In case there are two descriptions and GOP=I6B2:
data pkt 1 2 3 4 5 6 7 8 9 0 1 2 3.
The first stream will have this GOP: . . . I BB P BB P BB I BB P BB I . . . .
The second stream will have this GOP: . . . P BB I BB P BB I BB P . . . .
Suppose that each data packet carries the information relative to one entire subframe. If the $4^{th}$ data packet is lost from the $1^{st}$ stream, then a P picture is lost. If the same packet is lost from the $2^{nd}$ stream, then an I picture is lost.

If each bitstream has a regular GOP structure (a GOP whose structure is repeated over and over again without modifications), the pre-processor can "guess" what kind of picture the data packet was supposed to carry.

In the presence of a regular bitstream structure, such "guessing" may lead the decoder to infer the missing information (for instance, the packet type: I, intra; P, predicted; or B, bi-directional) from the Sequence Number or equivalent information. Then, instead of simply copying the data packet from one stream to the other, it will decode and re-encode on-the-fly the packet, as needed.

The first stream will have this GOP: . . . I BB P BB I BB P BB I . . .
The second stream will have this GOP: . . . P BB ? BB P BB I BB P . . .
In the example above, the $4^{th}$ data packet of $2^{nd}$ bitstream is missing. The corresponding data packet is taken from the $1^{st}$ bitstream. This packet carry a P picture, which is decoded and then re-encoded as an I picture as dictated by the GOP structure of the $2^{nd}$ bitstream.

If more than one packet is available for replacement, each available packet can be decoded, information can be averaged or processed as needed, then the data can be re-encoded on-the-fly creating the data packet as needed.

As an example, with an H.264 encoder, it is possible to quickly re-encode a replacement packets using the IPCM compression mode for macroblocks. In fact, the goal of the pre-processor is not to compress data but to create a valid replacement decodable packet. The IPCM compression mode is a way to encode macroblocks (16×16 pixels) so that the data packet is self-contained, i.e. independently decodable: neither temporal prediction nor spatial prediction is used. Incidentally, it can be observed that the encoding and decoding of IPCM packets is very fast and computationally inexpensive.

An interesting, more sophisticated example is represented by fake replacement packets. A fake replacement packet can specify that the portion of the frame is equal to the corresponding portion of the previous reference frame. For the case of H.264 this is done by specifying that the macroblocks referred by the missing or erroneous data packet are "skipped". It will be noted that this fake replacement causes the decoder to implement an effective concealment technique very similar to what is known as "copy previous".

In order to create a fake replacement packet, the pre-processor can use one or more packet prototypes which are to be modified as needed. For the case of H.264, the prototype packet contains several fields specifying the frame number and the portion of the frame (by means of number of $1^{st}$ macroblock in the slice—macroblocks are numbered from left to right, top to bottom): updating those fields, leaving other data as they are, will be sufficient.

When multiple description (MD) of the "spatial" type is used, the replacement packets for a given bitstream are derived from corresponding packets in other bitstreams. "Corresponding" means that replacement packets contain data relative to the same portion of the same frame.

When temporal MD is used, the replacement packet for a given bitstream are derived from corresponding packets in other bitstreams. "Corresponding" means that replacement packets contain data relative to the same portion of the frame (not the same frame—because of temporal downsampling).

For spatial MD, it is possible to proceed in the same way as for temporal MD. When there are no replacement candidates (packets containing data for the same portion of the same frame), replacement candidates from neighboring frames may be taken (packets containing data for the same portion but in previous or next frame).

By way of comparison with application level FEC (Forward Error Correction), the replacement of missing or erroneous data packets with data packets containing similar information can be seen as a sort of recovery provided by an application-level forward error correction (FEC).

However, there are many advantages in using this kind of recovery in the place of FEC-based recovery:

all the received data packets are used, and they can be decoded to contribute to output quality. On the opposite, when FEC is used, FEC packets do not directly contribute to output quality. If there are no errors, FEC packets are useless. If there are too many errors, FEC packets are insufficient. FEC codes have an all-or-nothing behavior.

even in presence of errors, there is no additional latency/complexity with respect to Single Description coding. On the opposite, when non-systematic FEC is used, FEC decoding is always needed; when systematic FEC is used, FEC decoding is needed only in presence of errors and it must be used before video decoding takes place. FEC decoding does add complexity and latency.

In fact, FEC codes can be characterized by a given error detection and correction capability. They have an all-or-nothing behavior. If the are too many errors, received bits will not be decoded correctly. In some case, this can be detected (errors detected but not corrected), in some other case, errors goes undetected. If there are errors, but not too many, received bits will be decoded correctly.

It is important to note that having some (correctable) errors is essentially the same as having no errors at all. When the channel is "good" there is a waste of capacity as the parity bits are useless. Unfortunately this is often the case as networks and systems are always designed to guarantee some performance in a given worst-case condition (and the worst case can be very bad).

For instance, for digital terrestrial TV, the FEC codes are designed to provide an acceptable quality for "far" receivers. Hence TV broadcast is heavily protected. This is not optimal for "near" receivers. These receivers could lower FEC protection, dedicate more bits to TV data and therefore experience a higher quality. On the opposite, when MD is used to generate parity bits, there is no all-or-nothing behavior, but rather a gentle degradation in performance: the higher the number of errors, the lower the quality of the decoded signal. This is due to the nature of multiple description coding: descriptions are independently decodable and the higher the number of decoded descriptions available, the higher the quality. Additionally, unlike standard FEC, when there are no errors, the quality can be higher than in the case some correctable error are present. In short: there is no waste in channel capacity.

The recovery process considered herein does not need any redundant data packet.

The case will now be considered of a decoupled post-processor for error/erasure concealment.

When only a subset of pixels has been reconstructed, unreconstructed or wrong pixels must be recovered in some way. If decoders are completely decoupled, unreconstructed or wrong pixels must be identified and corrected in the post-processing stage.

A simple mechanism that exploits the a priori statistics of a video signal is the median filter: usually unreconstructed or wrong pixels will be very different from neighboring pixels, therefore they will be discarded and substituted with a suitable value. As an example, the 3×3 median filter can be used.

Another simple, MD-aware mechanism will take as input the same set of groups which have been used for MD coding. Unreconstructed pixels in each group will be identified by computing the absolute difference of the pixels and the estimated average value. If above a given threshold, then the pixels will be replaced by the estimated average value. Alternatively, the pixel having the greatest absolute difference can be replaced always, regardless of the threshold.

While the error identification capability depends on the statistic of the video signal, a good point is that any concealment technique available in each decoder can be activated. If decoders are partially coupled, unreconstructed pixels may be set to a given agreed value. In this way, identification of pixels which have to be corrected is much easier. As an example, unreconstructed or wrong pixels may be set to black (Y=0, $C_b$=128, $C_r$=128). Alternatively and preferably, unreconstructed or wrong pixels may be set to an impossible value in the $YC_bC_r$ color space (Y=0, $C_b$=0, $C_r$=0).

The error identification capability depends on the robustness of the decoder against corrupted bitstreams. Any concealment techniques that is available in each decoder must be turned off. The preceding discussion highlights two issues: 1) identification of erroneous or missing pixels which must be concealed, 2) concealment of those pixels using available neighboring pixels (spatial and temporal neighbors). Both issues will now be addressed.

Identification (and replacement) of erroneous or missing pixels can take place after the merge of successfully decoded descriptions.

A first technique is averaging and discarding the "outlier", i.e. the outlier to be concealed is the pixel characterized by the largest difference with respect to an average value computed from neighboring pixels (in computing the average, it is possible to include the pixel itself). This is especially effective when descriptions correspond to single pixels, as is the case for plain polyphase downsampling MD. The average is computed using all descriptions. As an example: when 4 descriptions are generated by polyphase downsampling of 2×2 pixel blocks, the average is computed on that four neighboring pixels.

This technique can be applied to each component (Y, Cb, Cr) independently or it can be applied jointly. When it is applied jointly, decisions are combined using AND or using OR or another suitable function.

It can be easily understood that this technique is most effective if neighboring pixels are highly correlated (which is not always the case, especially on edges of objects). Also, if there are too many erroneous pixels, the average will be misleading.

This technique can be made even more effective if neighboring pixels are forced to be highly correlated. This can be obtained by lowpass filtering prior creating multiple descriptions.

A second candidate technique is median filtering: the neighboring pixels are ordered and the median (the n-th pixel in the ordered vector) is taken as a replacement for the current pixel. Outliers, being different from other pixels, will be placed first or last in the ordered vector. This technique can be applied to each component (Y, Cb, Cr) independently or it can be applied jointly When it is applied jointly, decisions are combined using AND or using OR or another suitable function.

Alternatively, vector median filtering can be used instead of scalar median filtering.

Unlike the former technique, this one is known to preserve edges. However, if there are too many erroneous pixels, the median will correspond to one erroneous pixel.

Still another alternative is indirect signalling by using invalid color triplets.

The identification of erroneous pixels can be made easier by programming the decoder so that instead of "concealing" errors it highlight them. The easiest way is to signal the erroneous or missing pixel by setting its luminance and chrominance to 0: Y=0, Cb=0, Cr=0. This is an invalid color triplet, hence the post-processor can easily identify outliers. The replacement can be computed by averaging or median filtering or others more sophisticated techniques.

This technique can be applied to each component (Y, Cb, Cr) independently or it can be applied jointly. When it is applied jointly, decisions are combined using AND or using OR or another suitable function.

A disadvantage of this technique lies in that it may require a particular configuration of decoders: they are instructed to clear luminance and chrominance of missing pixels. This may not be always possible.

Additionally, because of the prediction loop, the prediction error will be added to the cleared pixel. After some iteration, the pixel value is again a valid triplet, even if it is still erroneous. This happens because the drift (caused by clearing components) is recovered by the prediction error.

A variation of this technique is based on a threshold on YCbCr components: erroneous or missing pixels are not identified by checking for null components, but by checking for low components. Luminance is compared against a given threshold, if it is lower, the pixel is to be concealed. Chrominance is compared against a given threshold, if it is lower, the pixel is to be concealed. This technique can be applied to each component (Y, Cb, Cr) independently or it can be applied jointly When it is applied jointly, decisions are combined using AND or using OR or another suitable logical function.

As an example, for 8 bit components, thresholds for luma and chroma can all be set to 16. This is a nice value, as it is the default black level for luminance and the default minimum level for chrominance, when margins are used (instead of the full range from 0 to 255). If components are below thresholds, the pixel is to be concealed.

The use of thresholds let the decoder identify erroneous pixel even if the indirect signaling is polluted by adding the prediction error.

Still another variation of the same basic technique is based on thresholds applied on a color space clip value.

Based on luminance Y, maximum and minimum values acceptable for RGB components are computed (e.g. for Y=0, black, the max=min=0 for RGB); YCbCr is converted to RGB, values are clipped to maximum and minimum; the sum of absolute differences of clipped values and values is compared against a given threshold.

As an example, the C procedure to compute the clip value is shown here for the case of YCbCr color space:

```
int YCbCr2RGB(unsigned char cY, unsigned char cCb,
unsigned char cCr, unsigned char*cR, unsigned char*cG,
unsigned char*cB)
    { long int R, G, B, Y256, Cb, Cr, Rmin, Rmax, Gmin, Gmax,
Bmin, Bmax;
      int clipped; /* non zero if clipped */
      Y256 = (long int)cY<<8;
      Cb = (long int)cCb − 128L;
      Cr = (long int)cCr − 128L;
      R = (Y256        +359L*Cr +128)>>8;
      G = (Y256 −88L*Cb −183L*Cr +128)>>8;
      B = (Y256 +454L*Cb        +128)>>8;
      Rmax = (Y256 +38)/ 77L; if (Rmax>255L) Rmax = 255L;
      Gmax = (Y256 +75)/150L; if (Gmax>255L) Gmax = 255L;
      Bmax = (Y256 +14)/ 29L; if (Bmax>255L) Bmax = 255L;
      Rmin = (Y256 −150L*255L − 29L*255L +38)/ 77L; if (Rmin< 0L)
Rmin = 0L;
      Gmin = (Y256 − 77L*255L − 29L*255L +75)/150L; if (Gmin< 0L)
Gmin = 0L;
      Bmin = (Y256 − 77L*255L −150L*255L +14)/ 29L; if (Bmin< 0L)
Bmin = 0L;
         clipped = 0;
         if (R>Rmax) { clipped+=(int)(R−Rmax); R=Rmax; }
         if (R<Rmin) { clipped+=(int)(Rmin−R); R=Rmin; }
         if (G>Gmax) { clipped+=(int)(G−Gmax); G=Gmax; }
         if (G<Gmin) { clipped+=(int)(Gmin−G); G=Gmin; }
         if (B>Bmax) { clipped+=(int)(B−Bmax); B=Bmax; }
         if (B<Bmin) { clipped+=(int)(Bmin−B); B=Bmin; }
         *cR = (unsigned char)R;
         *cG = (unsigned char)G;
         *cB = (unsigned char)B;
         return (clipped);
    }
```

The higher the clip value, the higher the likelihood that the pixel may need concealment. Because of the quantization of decoded YCbCr components, the clip value may be different from 0. As an example, the threshold for the clip value can be 60. If the clip value is above the threshold, the pixel is to be concealed.

It will be appreciated that this technique may be applied to color spaces other than the aforementioned YCbCr. The key concept is to compute maximum and minimum values based on the luminance. The computation is straightforward. For YCbCr, the matrixes for converting from/to RGB are as follows:

[R] 1 [256 0 359] [Y]
[G]= - - - [256 88 −183] [Cb-128]
[B] 256 [256 −454 0] [Cr-128]
[Y] 1 [77 150 29] [R] [0]
[Cb]= - - - [−43 −85 128] [G]+[128]
[Cr] 256 [128 −107 −21][B] [128]

From the first line of the second matrix, maximum acceptable values are:
R_max(Y)=Y 256/77
G_max(Y)=Y 256/150
B_max(Y)=Y 256/29

From the first line of the second matrix, minimum acceptable values are:
R_min(Y)=(Y 256 −150*255 −29*255)/77
G_min(Y)=(Y 256 −77*255 −29*255)/150
B_min(Y)=(Y 256 −77*255 −150*255)/29

When integers are used, rounding is performed by substituting y=x/Q by y=(x+Q/2)/Q. When components have n bits, $2^n-1$ should be used instead of 255. When coefficients are represented with higher accuracy, the scaling factor 256 is increased.

Decoded chrominance can be downsampled with respect to decoded luminance (e.g. 4:2:2 or 4:2:0 formats). In this case, either upsampling to 4:4:4 is done prior computing the clip values (e.g. by replicating chroma samples) or an average value for luma corresponding the given chroma is computed.

As an example, for the 4:2:0 format, every Cb-Cr couple correspond to 4 luma samples. These 4 samples can be averaged and the resulting tripled can be checked (YavgCbCr). Alternatively, the same chroma can be used for all related luma pixels. Therefore the following triplets are checked: Y1CbCr, Y2CbCr, Y3CbCr, Y4CbCr.

The two last techniques considered (thresholds on YCbCr and on color space clip value) can be combined and used simultaneously to identify erroneous or missing pixels.

As an example, the clip value can be set to 0. Erroneous or missing pixels are those having a clip value higher than the threshold. Because of quantization of YCbCr, some valid pixel will have a non-zero clip value. However, instead of increasing the threshold (reaching the suggested value of 60 as for the next-to-last technique considered in the foregoing), a second check is performed on the YCbCr components.

Following what has been illustrated for the technique considered above, erroneous pixels are those having all components below given thresholds (Y<Yth AND Cb<Cbth AND Cr<Crth), threshold should be low. Reverting the argoment: valid pixels are those having at least one component above a given threshold (Y>Yth OR Cb>Cbth OR Cr>Crth), thresholds should be high.

As an example, pixels having at least one component above 192 are declared to be valid even if their clip value is greater than zero. It is unlikely that a given pixel, whose components have been cleared by the decoder in the past, have one component above such an high threshold because of the added prediction error.

Decisions can be combined by AND or by OR or by another suitable logical function. The above example combines decisions by AND NOT: (clip>clip_threshold) AND NOT (Y>Y_threshold OR C>C_threshold OR C>C_threshold).

The identification of erroneous or missing pixels can be made more robust by taking decisions blockwise instead of deciding on single pixels. This is clearly an advantage, especially because state-of-the-art codecs operate blockwise: errors come in blocks (typically in macroblocks, 16×16 pixels, or blocks, 8×8 pixels).

These checks can be done by averaging luminance samples and chrominance samples and then comparing results against their thresholds. This yield one hard decision which affects all samples used.

The components can be processed independently or jointly. When they are processed jointly, decisions can be combined by AND or by OR to get the final decision.

Alternatively, hard decisions can be taken pixel-wise (1=pixel to be concealed, 0=valid pixel) and then counted. If there are enough valid pixels (0s are counted), then the block is considered valid, otherwise all its pixels must be concealed. Reverting the argument, if there are enough erroneous pixels (1s are counted), then the block is considered erroneous, otherwise all its pixels are declared valid.

Again, components can be processed independently or jointly. When they are processed jointly, counters can be aggregated by summation. The threshold should be scaled suitably.

As an example, decisions can be taken on 16×16 blocks which correspond to block size used by the decoder. Alternatively, decisions can be taken on 2×2 blocks which are the smallest block having luminance (4 Y samples) and chrominance (1 Cb and 1 Cr sample) for the 4:2:0 format.

An enhancement of the technique described may come from double decoding.

Indirect signaling forces the decoder not to conceal erroneous pixels, but rather to highlight them. In order to exploit error concealment capabilities embedded in the decoder, each description can be decoded twice: the first pass is done by configuring the decoder for indirect signaling, the second pass is done by configuring the decoder for error concealment.

The post-processor can then take descriptions decoded on the first pass and identify erroneous or missing pixels. However, concealment is applied to descriptions decoded on the second pass.

As regards the concealment of erroneous or missing pixels, and the computation of replacement, in the case median filtering is used, the replacement can be computed by ordering valid neighboring pixels and taking the n-th pixel (if n-th is in the middle, it is called the median). Neighboring pixels are those spatially and temporally adjacent. E.g. those in a 3×3 window centered on the pixel which is to be concealed.

Alternatively, low pass filtering can be used: the replacement is computed as a weighted average of valid neighboring pixels. The weighted average can be interpreted as a lowpass filter. If weights are all equals and their sum is 1, the replacement is simply the average of valid neighboring pixels. E.g. neighboring pixels can be those in a 3×3 window centered on the pixel which is to be concealed: this is a 2D lowpass filter.

In an enhanced version, providing for edge-driven selection of lowpass filters, more than one replacement can be computed. As an example, several lowpass filters can be used: one vertical, one horizontal, two diagonals (top-left to bottom-right, top-right to bottom-left). The selection of the best replacement is driven by the direction of the detected edge.

As an example, the edge direction can be detected by taking the difference of neighboring pixels along a particular direction. The pair with the least absolute difference, identify the direction of the edge. The replacement should be computed by lowpass filtering along the same direction.

For instance, this can be done by numbering the pixels in a 3×3 window centered on the pixel (the 5-th) which is to be concealed:

1 2 3
4 5 6
7 8 9

Depending on valid neighboring pixels, four replacements can be computed by directional 2-taps lowpass filters: r_vertical=(p2+p8)/2, r_horizontal=(p4+p6)/2, r_diag1=(p1+p9)/2, r_diag2=(p3+p7)/2. The selected replacement is the one computed from pixels having the least absolute difference.

When 4 descriptions are created by subsampling of 2×2 pixel blocks, the couples of pixels come from the same description. This makes the absolute difference more reliable from the point of view of edge detection. In fact, when pixels coming from different descriptions are used, it may happen that their difference is due to the independent quantization done at encoding time, rather than being caused by an edge present in the picture—this results in the wrong edge direction being detected.

Still another possible enhancement of the technique described may derive from fallback to already concealed neighboring pixels. Usually, the replacement is computed based on valid neighboring pixels. If there are no valid neighboring pixels, previously concealed neighboring pixels can be used instead.

For the purpose of concealment of corrupted description and merging of concealed descriptions, the post-processor may not only compute the concealment where needed, but also merge the concealed descriptions and produce an output video sequence directly. No need exists of using a separate processing block to merge the output of each decoder.

In the case of an embodiment providing for the presence of decoupled pre/post-processors for error/erasure Concealment, the pre-processor is used to identify and replace missing data packets so that decoders evolve in the (almost) right state. Simultaneously, error flags are computed and passed to the post-processor which use them to identify pixels which are to be concealed.

The error flags can be easily computed if they can be deduced by the packet number. E.g. video encoders, can be configured to produce a data packet every N macroblocks (16×16 pixels). For a CIF resolution sequence (352×288 pixels), there can be 11 MBs/pkt (half MB row), therefore there are 36 pkts/frame, 2 pkts/MBrow. If packets are numbered from 0 and the number of the missing packet is SN (seq. number): the number of the frame which is to be processed by the post-processor is frame_nr=fix(SN/36); the MBrow to be processed in that frame is MBrow_nr=fix((SN-frame_nr*36)/2), as there are 2 pkts/MBrow; and so on.

Alternatively, if it is not possible to deduce error flags by the packet number, the replacement packet (if present) can be partially decoded to deduce which part of which frame is going to be affected (if this information is embedded in the syntax).

There are various advantages related to the decoupled pre-processor plus decoupled post-processor arrangement: error flags computed by the pre-processor can be signaled to the post-processor which can therefore be simplified (e.g. by failing to include the identification of erroneous or missing pixels). Decoders need not be configured for indirect signaling of errors, their concealment capabilities can be activated and used.

As regards error propagation, the error flags computed in the pre-processor can be computed so that error propagation is taken into account. As an example, with state-of-the-art video codecs, if the GOP structure is regular and repeated over and over, every N-th frame will be an intra (I) frame, every M-th frame will be a predicted frame (P), while every other frame will be bidirectionally predicted frame (B). B frames depend on the previous and next I or P frames. P frames depend on the previous I or P frames. E.g. for a GOP=12, 2: every 12-th frame is an I-picture, every 3-rd frame (not being an I) is a P picture.

Losing a B frame will cause errors that do not propagate. Conversely, losing a P frame, will cause errors that propagate to the following P frames and to the related B frames or, to be more precise, the B frames related to this P frame and to the following affected P frames. The worst case is losing an I frame: errors will affect the whole GOP until the next I picture.

If the GOP structure is regular and repeated over and over again, it is possible to deduce the frame type by the packet number (sequence number). Alternatively, if it is not possible to deduce the frame type by the packet number, the replacement packet (if there is one) can be partially decoded to deduce the type of the frame affected by the loss (if this information is embedded in the syntax).

Error flags computed for a given frame, take into account what happened in the past depending on the frame type. This occurs as follows:
  if the data packet is missing, error flags are set for corresponding pixels;
  if the data packet is not missing and it is relative to an I frame, error flags are cleared for corresponding pixels;
  if the data packet is not missing and is relative to a P frame, error flags are computed from those of the previous P or I frame. Computation can be done by simply copying or by copying and scaling (in case error flags are represented with more than 1 bit);
  if the data packet is not missing and it is relative to a B frame, error flags are computed from those of the previous and following (in display order) P or I frame. Computation can be done by simply logical combining (e.g. by using OR) or by logical combining and scaling (in case error flags are represented with more than 1 bit).

The optional scaling of error flags takes into account the fact that the error is recovered by the added prediction error. Therefore errors disappear naturally after a sufficient interval of time has elapsed, provided a non-zero prediction error has been added.

The possible use of a coupled post-processor for error/erasure concealment is based on the possibility of sharing decoded frames, sharing motion vectors and decoding by simultaneous error detection and concealment.

In fact, error concealment capabilities can be increased by sharing decoded subframes when decoding multiple compressed descriptions.

When decoding a given compressed substream, a lost anchor frame will yield a noticeable error in the current decoded subframe. Moreover, subsequent decoded frame will suffer from error propagation because of the loss of sync between the MC loops of the encoder and of the decoder.

Error propagation is greatly reduced if the lost or corrupted anchor frame is concealed by using the corresponding decoded frames from other subsequences. Clearly, some residual drift may be expected because the concealment will not be perfect.

Of course, classical concealment algorithms may be applied for that purpose. As an example, the corrupted portion may be copied from previously correctly decoded frames within the same subsequence.

Error concealment capabilities can be increased by sharing motion vectors from decoded MD substreams.

When decoding a given compressed substream, some motion vector may be lost or corrupted. Usually this is concealed by using motion vectors of neighboring or previous blocks. However, concealment will be much more effective if corresponding motion vectors from other subsequences are used.

As an example, a median filter can be used to choose among the motion vectors available from other subsequences. This is usually done by choosing among motion vectors from neighboring and previous macroblocks within the same subsequence.

If independent decoders are used, their concealment capability is limited to a subsequence. They cannot access spatially neighboring and temporally adjacent pixels available in other subsequences.

Accessing such correlated information may increase the effectiveness of the concealment. As an example, edge detection for spatial concealment is much more accurate.

Concealment techniques for erroneous or missing pixels are the same as those described in the foregoing when discussing the decoupled post-processor approach. The only difference is that error flags need not be estimated, as they are generated by the decoder. To be more precise, by interpreting the syntax of incoming bitstreams, each decoder can signal to the post-processor where concealment it is needed. Typically, state-of-the-art codecs operates blockwise, therefore they pass only one bit for each processed block to the post-processor. This bit has a conventional value (e.g. 1) when concealment is needed. It has the opposite value (e.g. 0) when concealment is not needed.

The post-processor can further elaborate on these 'hard' (i.e. 1 bit) error flags to compute 'soft' (i.e. more than 1 bit) error flags as described earlier in the "Error propagation" paragraph.

One exemplary practical embodiment is based on the following operating concepts:
  the decoder loops, reading the bitstream until it completes the decoding of one frame;
  the decoder communicates the decoded frame to the post-processor and block error flags and block type (I or intra spatially predicted, P or temporally predicted, B or temporally bidirectionally predicted . . . ) either by copying the data or by passing a pointer referring to the data, and then waits for the concealment to be completed;
  the post-processor further elaborates on the error flags and applies the concealment where it is needed;
  having completed the concealment, the post-processor communicates back the concealed frame; and
  optionally, the post-processor can also merge the concealed description and produce directly an output sequence; there is no need of using a separate processing block to merge the output of each decoder.

Several modifications are possible taking into account various factors.

For instance, communication "granularity" takes into account that communication between decoders and post-processor need not to be frame based. The decoder can communicate the result of decoding a data packets as soon as it is available. This can be done in a multi-processor environment. Conversely, because of the penalty associated with task-switching in a mono-processor environment, sometimes it is better to minimize the number of switches increasing the granularity as much as possible.

Communication synchronicity takes into account that the post-processor need not to wait for all decoders to communicate their decoded frame. This is optimal in a real-time environment: if a decoder stalls because of any reason (internal error, incoming bitstream blocked), the post-processor is able to continuously produce an output using data communicated by other decoders.

Communication optimization may lead the post-processor to communicate back to decoders only some of the concealed frames. Specifically, only reference frames (I and P frames and not-disposable B frame) may need to be passed back to mitigate error propagation due to corrupted frames in the anchor frame buffer. This speeds up communications. Additionally, if the post-processor does not elaborate on error flags, block types are not needed.

Concealment of corrupted description and merging of concealed descriptions relies on the fact that the post-processor not only computes the concealment where it is needed, but can also merge the concealed descriptions and produce an output video sequence directly. Thus, there is no need to use a separate processing block to merge the output of each decoder.

Frames are communicated to the post-processor in decoding order, while they should be outputted in display order. The reordering requires the post-processor to read the frame number from decoders.

Alternatively, the frame number can be deduced from the GOP structure. For instance if there is an I picture every 12 frames, and if there are 2 B pictures between consecutive I and P frames, the GOP structure is (12,2). The decoding frame order is: I0 P3 B1 B2 P6 B5 B4 P9 . . . etc. . . . the display order is: I0 B1 B2 P3 B4 B5 P6 . . . etc. . . .

Frame numbers may play a significant role in driving properly the merging of successfully decoded (and concealed) descriptions. Because of data loss, it may happen that one decoder skips one or more frames. For instance, if a decoder A loses frame No. 3 while the decoder B does not, then the decoder A may skip to frame No. 4. One of these two situations may occur:
  the post-processor reads nothing from the decoder A and frame No. 3 from the decoder B, therefore everything goes smooth: the output frame No. 3 will be computed from the No. 3 provided by the decoder B—which is right;
  the post-processor reads frame No. 4 from the decoder A and frame No. 3 from the decoder B, concealment (and the subsequent merge) will be wrong because different frames are being processed at the same time: the output frame No. 3 will be computed from No. 3 from the decoder B and from No. 4 from the decoder A—which is wrong.

If frame numbers are passed on to the post-processor, then this can detect frame skipping. Therefore concealment (and the subsequent merge) are always done by processing the correct frames, while leaving others in a temporary storage area.

Concealment techniques for motion vectors rely on the fact that coupled post-processing is beneficial because it stops error propagation due to corrupted reference data used by each decoder. In the previous paragraph, pixel concealment has been discussed. Pixels of particular frames (I, P, non disposable B) are taken as a reference for prediction (the well-known motion compensation), therefore communicating back the result of the concealment, let each decoder have an high quality (even if not perfect) reference frame. The same holds for the prediction of motion vectors. Motion vectors can be encoded independently or they can be spatially predicted or they can be temporally predicted. It is clear that the post-processor should at least communicate back to each decoder those motion vectors Which are used as a reference for other motion vectors but which are currently unavailable because of data loss or corruption.

The concealment of a motion vector can be computed by taking the mean value (i.e. the average value of the components along x and y) of the corresponding (same frame, same position within frame) motion vectors in other descriptions. Spatially neighboring motion vectors in the same description may be used additionally. As an alternative, the scalar median filter (median of the components) can be used. The vector median filter can be used represents still another alternative.

Another concealment of a motion vector can be computed by taking into account corresponding motion vector in previous and/or next frames of the same description or other descriptions.

Adaptive joint concealment techniques rely on the possibility for various concealment techniques to be operated at the same time. Furthermore they can be joined to get an improved concealment. As an example, the case can be considered of adaptivity driven by:
  the modulus of the motion vectors
  the magnitude of prediction error of pixels.

As an example, if the modulus of the motion vectors is higher than a given threshold, spatial concealment techniques may be preferred as the temporal correlation is poor. Then, edge-driven lowpass filtering of spatially neighboring pixels can be used.

Conversely, if the modulus of the motion vectors is lower than a given threshold, temporal concealment techniques may be preferred since a strong temporal correlation exists. Then, lowpass filtering of temporally neighboring pixels can be used.

As another example, the prediction error of pixels may be used to evaluate the amount of temporal correlation. If the prediction error is higher than a given threshold, then spatial concealment techniques should be preferred both for concealment of missing/erroneous pixels and motion vectors.

The output of spatial and temporal concealment techniques can be combined linearly by weighted sum. Weights are computed based on motion vector modulus.

Motion compensated temporal concealment may play a role in those concealment techniques that include lowpass filtering using pixels whose selection is driven by the modulus of motion vectors. That is, a concealment motion vector can be computed as described previously. Next, this motion vector can be refined by looking for a best match between available pixels in the area to be concealed, and available pixels indicated by the motion vector. Then, lowpass filtering can be applied to compute the missing or erroneous pixels.

To sum up:
  pure spatial vs. pure temporal concealment techniques may be selected and/or combined;
  motion-compensated temporal concealment may be selected alternatively.

In those embodiments providing for a coupled pre/post-processor for error/erasure concealment, the pre-processor operates on the input of each decoder by concealing erroneous or missing packets. The pre-processor however is coupled to the post-processor: it computes and signal error flags as described earlier in connection with the decoupled pre/post-processor arrangement. Unlike the embodiment described earlier, in the further exemplary embodiment disclosed herein the post-processor is coupled and it communicates with decoders.

Error flags are computed and signaled by the pre-processor, and there is no need for the post-processor to read them from each decoder. Error flags can be processed either in the pre-processor or in the post-processor as described previously.

Backward signaling from the post-processor to the pre-processor may occur since, as discussed before, the pre-processor may re-encode on-the-fly a replacement packet. The information to be inserted in the replacement packet concerns the same portion of the same frame whose data was carried by the missing or erroneous packet. The information may be derived by decoding replacement packets and averaging the decoded information. For H.264 re-encode can be simply done using the IPCM compression mode. Alternatively, the information to be re-encoded on-the-fly may be communicated by the post-processor.

As an example, the post-processor can communicate the data relative to the previous frame. When there are no replacement candidates, the pre-processor can use this information to make the decoder implement automatically the "copy previous" concealment policy.

Figure 12:
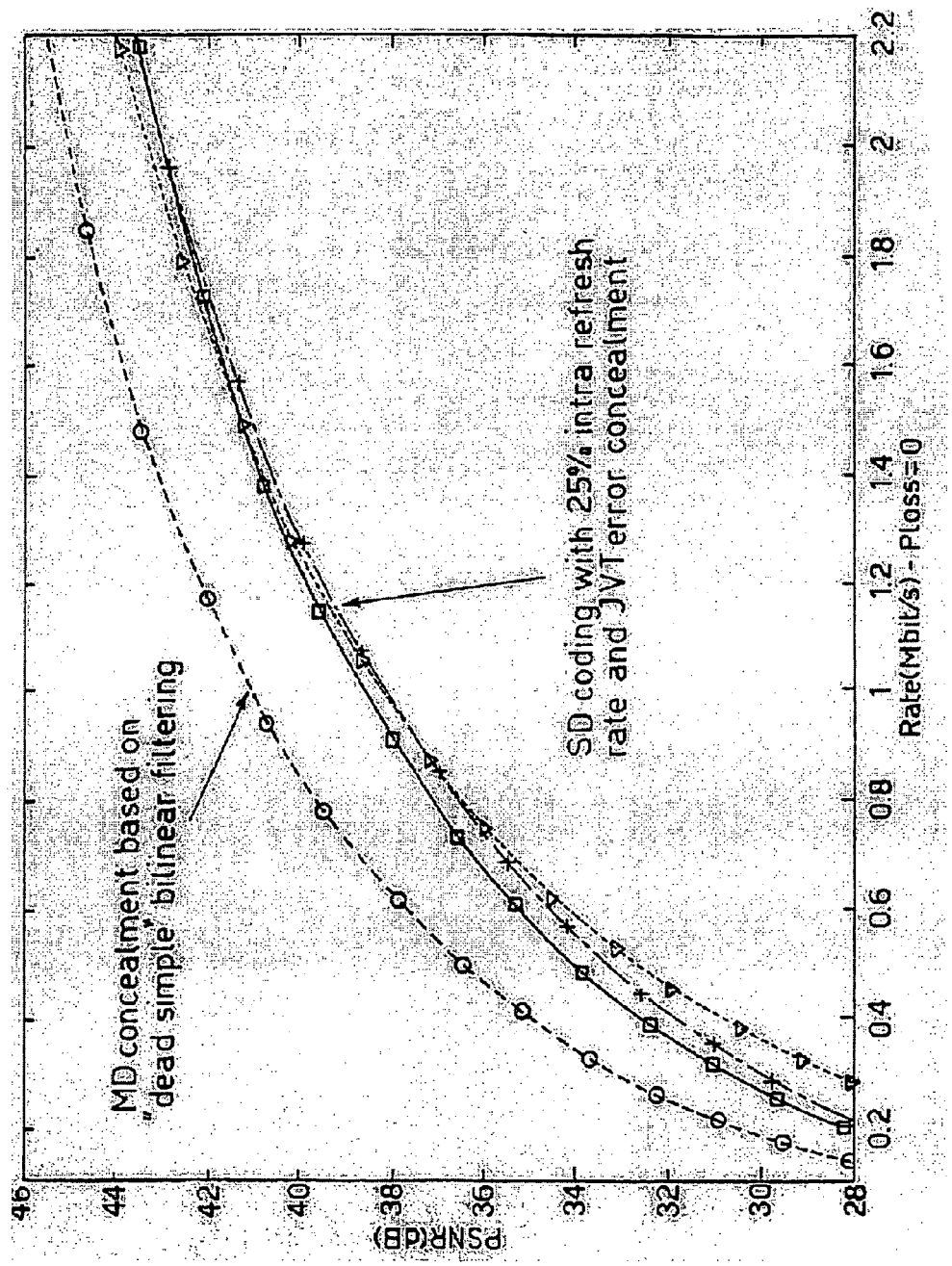
FIGS. 12 and 13 are diagrams exemplary of performance of an arrangement as described herein in comparison with prior art arrangements.
Figure 13:
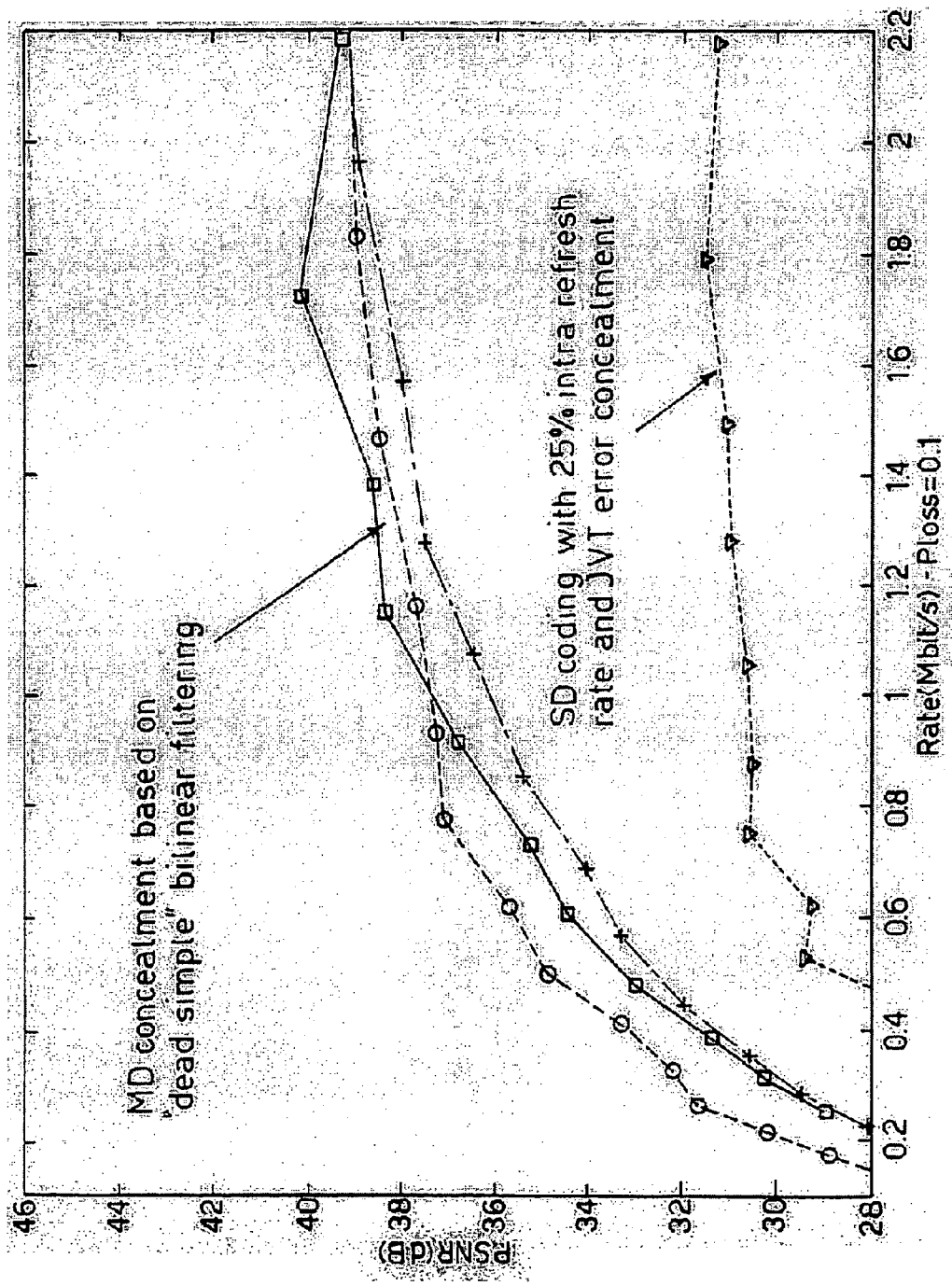

FIGS. 12 and 13 are diagrams providing evidence of the intrinsic superiority of multiple descriptions over a single description (SD) even when made more resistant by resorting to the technique known as "intra refresh", which aims at stopping propagation of errors. In both figures, the ordinate scale is noted in terms of Peak Signal-to-Noise Ratio (PSNR), while the abscissa scale is noted in term of transmission rate (Mbit/s) for Ploss (PL) equal to 0 (FIG. 12) and 0.1 (FIG. 13), respectively.

The upper curve in the figures relates to a system using two multiple descriptions (2MD), while the other curves relate to systems using four multiple descriptions (4MD), three multiple descriptions (two plus one multiple descriptions by frames expansion—3MD) and a single description (SD)

In FIG. 12, these last curves are essentially superposed (i.e. have the same compression efficiency) since the single description has been made resistant to errors by increasing the non-predicted portions (i.e. the "intra" portions). In FIG. 13, the lowest curve is the error-resistant single description (SD), which is however largely ineffective in comparison with multiple descriptions: being much lower (with reference to the ordinate scale) it corresponds to a poorer visual quality.

Again, while video signals/bitstreams have been almost exclusively referred to in the foregoing in describing certain exemplary embodiments of the invention, those of skill in the art will immediately recognize that the same reasoning can be applied e.g. to audio signals. Generally speaking, the arrangement disclosed herein is applicable to multiple description coding of any digital signals, independently of their nature (audio, video, data). This applies primarily, but not exclusively, to the following arrangements:
- decoupled pre-processing;
- decoupled post-processing;
- decoupled pre/post-processing;
- coupled post-processing with concealment of missing/erroneous pixels and motion vectors and adaptive selection (temporal or spatial) of concealment approach;
- coupled pre/post-processing with forward and backward signalling.

Consequently, without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

The invention claimed is:

1. A method of processing digital signals, comprising:
converting the digital signals between a first format and a second format, wherein said second format conveys multiple descriptions of said digital signals; and
subjecting said digital signals to an error concealment process that includes filling gaps in said digital signals causing a loss of data, wherein the filling gaps includes:
identifying candidate replacement data for filling said gaps as data packets having exactly identical sequence numbers as missing or erroneous data packets of the gaps; and
filling gaps in one of said descriptions by copying, as replacement data for filling said gaps, data taken from others of said descriptions.

2. The method of claim 1, wherein filling gaps includes filling gaps in one of said descriptions by decoding data taken from others of said descriptions and then re-encoding on-the-fly said data taken from others of said descriptions as replacement data for filling said gaps.

3. The method of claim 1, further comprising:
arranging said digital signals in frames including macroblocks, each frame including a fixed number of data packets per frame;
identifying a sequence number of at least one data packet giving rise to one of said gaps affecting said signals; and
determining at least one of: a frame number of an affected frame, a number of a first macroblock affected, and a number of a last macroblock affected.

4. The method of claim 1, wherein said error concealment process includes filling said gaps by replacing one data packet involved in the gap by:
decoding a set of data packets taken from others of said descriptions and containing information identical to information carried by said one data packet involved in the gap, and separating from the set of data packets said information carried by said one data packet involved in the gap;
encoding said information thus separated to produce a replacement packet; and
replacing said one data packet involved in the gap by said replacement packet obtained by encoding.

5. The method of claim 1, wherein said error concealment process includes:
discarding a set of neighboring data packets including at least one data packet involved in the gap; and
replacing said discarded set of neighboring data packets by a replacement data packet taken from said others of said descriptions.

6. The method of claim 1, wherein said error concealment process includes filling said gaps by replacing a set of neighboring packets including at least one data packet involved in the gap by a plurality of replacement packets containing information identical to information carried by said set of neighboring packets including at least one data packet involved in the gap.

7. The method of claim 1, wherein said error concealment process includes:
discarding a set of neighboring data packets including at least one data packet involved in the gap; and
replacing said discarded set of neighboring data packets by a plurality of replacement data packets taken from said others of said descriptions.

8. The method of claim 1, wherein said error concealment process includes:
- discarding a set of neighboring data packets including at least one data packet involved in the gap; and
- decoding a set of data packets taken from others of said descriptions and containing information identical to information carried by said one data packet involved in the gap, and separating from the set of data packets said information carried by said one data packet involved in the gap;
- encoding said information thus separated to produce a plurality of replacement packets; and
- replacing said discarded set of neighboring data packets by said plurality of replacement packets obtained by encoding.

9. The method of claim 1, wherein said error concealment process includes:
- discarding a set of neighboring data packets including at least one data packet involved in the gap; and
- replacing said discarded set of neighboring data packets by a plurality of fake replacement packets.

10. The method of claim 1, further comprising identifying candidate replacement data for filling said gaps by examining previous and following data packets in the description containing the gap and in the others of said descriptions.

11. The method of claim 10, further comprising:
- facilitating identifying the gap as data missing between said first and said second portions by arranging said digital signals in frames, wherein the previous data packets in the description contain gap carry information for a first given portion of a given frame and the following data packets in the description contain gap carry information for a second portion of a given frame;
- at least partly decoding the packets in said others of said descriptions to identify what portion of what frame is one to which information carried by the packets in said others of said descriptions relates; and
- filling said gap by replacement data packets taken from said others of said descriptions.

12. The method of claim 1, wherein said error concealment process includes filling said gaps by replacing at least one data packet involved in the gap by at least one fake replacement packet.

13. The method of claim 12, further comprising including in said fake replacement packet information selected out of:
- gray or blank pixel information; and
- a related portion of a corresponding frame containing information identical to information contained in a same portion of a previous frame.

14. The method of claim 1, wherein said error concealment process includes filling said gaps by replacing one data packet involved in the gap by a plurality of replacement packets containing information identical to information carried by said one data packet involved in the gap.

15. The method of claim 14, further comprising:
- checking a sequence number of a first one of said plurality of replacement data packets for equality to a sequence number of said one data packet involved in the gap; and
- if said checking reveals inequality, modifying the sequence number of said first one of said replacement data packets before replacing said one data packet involved in the gap to render said sequence number of said first one of said replacement data packets equal to the sequence number of said one data packet involved in the gap being replaced thereby.

16. The method of claim 14, further comprising allotting to said plurality of replacement packets sequence numbers having monotonically increasing values.

17. The method of claim 14, further comprising correcting, by adding an offset, sequence numbers of the packets following said one data packet involved in the gap.

18. The method of claim 1, wherein said error concealment process includes filling said gaps by replacing a data packet involved in a gap by a replacement packet containing information identical to information carried by said data packet involved in the gap.

19. The method of claim 18, further comprising allotting to said replacement data packet a sequence number identical to a sequence number of said one data packet involved in the gap.

20. The method of claim 19, further comprising:
- checking the sequence number of said replacement data packet for equality to the sequence number of said one data packet involved in the gap; and
- if said checking reveals inequality, modifying the sequence number of said replacement data packet before replacing said one data packet involved in the gap to render said sequence number of said replacement data packet equal to the sequence number of said one data packet involved in the gap being replaced thereby.

21. The method of claim 1, wherein subjecting said digital signals to the error concealment process is part of converting said digital signals from said second format conveying multiple descriptions to said first format.

22. The method of claim 21, wherein converting said digital signals from said second format conveying multiple descriptions to said first format includes:
- decoding said multiple descriptions; and
- merging the decoded multiple descriptions to produce said first format.

23. The method of claim 22, further comprising filling gaps in said digital signals causing a loss of data before said step of merging the decoded multiple descriptions to produce said first format.

24. The method of claim 22, further comprising filling gaps in said digital signals causing a loss of data after said step of merging the decoded multiple descriptions to produce said first format.

25. The method of claim 24, further comprising causing said decoding step to identify said gaps by checking for either of null or threshold values of luminance and/or chrominance components.

26. The method of claim 24, further comprising:
- computing an average value of said digital signals corresponding to said decoded multiple descriptions; and
- discarding outlier signal values of said digital signals having a largest difference with respect to said average value computed.

27. The method of claim 26, further comprising:
- expressing said digital signal as pixel values; and
- including said outlier signal values in computing said average value.

28. The method of claim 24, further comprising:
- expressing said digital signal as pixel values;
- computing a median value of said digital signals using said decoded multiple descriptions; and
- taking said median value as a replacement for a current pixel value.

29. The method of claim 28, wherein computing said median value includes using either of vector median filtering and scalar median filtering.

30. The method of claim 24 wherein filling gaps includes filling said gaps by a weighted average of valid neighboring pixels.

31. The method of claim 30, further comprising selecting said weighted average out of a vertical average, a horizontal average, and two diagonals averages.

32. The method of claim 24, further comprising causing said decoding step to highlight said gaps.

33. The method of claim 32, wherein causing said decoding step to highlight said gaps includes causing said gaps to correspond to given luminance and/or chrominance values.

34. The method of claim 32, wherein decoding said multiple descriptions includes decoding each of said descriptions twice, by a first pass that includes identifying said gaps and a second pass that includes error concealment applied to said descriptions that are decoded in said second pass.

35. A method of processing digital signals, comprising:
converting the digital signals between a first format and a second format, wherein said second format conveys multiple descriptions of said digital signals; and
subjecting said digital signals to an error concealment process, wherein subjecting said digital signals to the error concealment process is part of converting said digital signals from said second format conveying multiple descriptions to said first format, wherein converting said digital signals from said second format conveying multiple descriptions to said first format includes:
decoding said multiple descriptions; and
merging the decoded multiple descriptions to produce said first format;
filling gaps in said digital signals causing a loss of data after said step of merging the decoded multiple descriptions to produce said first format; and
causing said decoding step to identify said gaps by checking for either of null or threshold values of luminance and/or chrominance components, wherein causing said decoding step to identify said gaps includes:
computing maximum and minimum luminance values acceptable for RGB components;
clipping luminance values to said maximum and minimum values; and
comparing a sum of absolute differences of said luminance values and said clipped values against a threshold.

36. The method of claim 35, further comprising:
checking the sequence number of said replacement data packet for equality to the sequence number of said one data packet involved in the gap; and
if said checking reveals inequality, modifying the sequence number of said replacement data packet before replacing said one data packet involved in the gap to render said sequence number of said replacement data packet equal to the sequence number of said one data packet involved in the gap being replaced thereby.

37. The method of claim 35, wherein said error concealment process includes filling said gaps by replacing one data packet involved in the gap by a plurality of replacement packets containing information identical to information carried by said one data packet involved in the gap, further comprising:
checking a sequence number of a first one of said plurality of replacement data packets for equality to a sequence number of said one data packet involved in the gap; and
if said checking reveals inequality, modifying the sequence number of said first one of said replacement data packets before replacing said one data packet involved in the gap to render said sequence number of said first one of said replacement data packets equal to the sequence number of said one data packet involved in the gap being replaced thereby.

38. A system for processing digital signals, comprising:
a converter that converts the digital signals between a first format and a second format, wherein said second format conveys multiple descriptions of said digital signals;
at least one error concealment processor for subjecting said digital signals to an error concealment process;
at least one decoder for decoding said multiple descriptions; and
at least one merging processor for merging the decoded multiple descriptions to produce said first format, wherein said at least one error concealment processor is configured to:
subject said digital signals to an error concealment process in converting said digital signals from said second format conveying multiple descriptions to said first format;
perform said error concealment process by filling gaps in said digital signals causing a loss of data; and
fill said gaps in said digital signals causing the loss of data after said merging processor merges said decoded multiple descriptions to produce said first format,
wherein said decoder is configured to identify said gaps by checking for either of null or threshold values of luminance and/or chrominance components, wherein said decoder is configured to identify said gaps by:
computing maximum and minimum luminance values acceptable for RGB components;
clipping luminance values to said maximum and minimum values; and
comparing a sum of absolute differences of said luminance values and said clipped values against a given threshold.

39. The system of claim 38, wherein said at least one error concealment processor is configured to, for each of said gaps, add an offset to sequence numbers of packets following a data packet involved in the gap.

40. The system of claim 38, wherein said at least one error concealment processor is configured to, for each of said gaps:
check the sequence number of a replacement data packet for equality to the sequence number of said data packet involved in the gap, and
if said check reveals inequality, modify the sequence number of said replacement data packet before replacing said data packet involved in the gap to render said sequence number of said replacement data packet equal to the sequence number of said data packet involved in the gap being replaced thereby.

41. A non-transitory computer readable storage medium having computer-executable instructions thereon for performing the following:
converting the digital signals between a first format and a second format, wherein said second format conveys multiple descriptions of said digital signals; and
subjecting said digital signals to an error concealment process, wherein said error concealment process includes filling gaps in said digital signals causing a loss of data and wherein the filling gaps includes:
identifying candidate replacement data for filling said gaps as data packets having exactly identical sequence numbers as missing or erroneous data packets of the gaps; and filling gaps in one of said descriptions by copying, as replacement data for filling said gaps, data taken from others of said descriptions.

42. The non-transitory computer readable storage medium of claim 41, wherein subjecting said digital signals to the error concealment process is part of the converting said digital signals from said second format conveying multiple descriptions to said first format.

43. The non-transitory computer readable storage medium of claim 42, wherein the converting said digital signals from said second format conveying multiple descriptions to said first format includes:
decoding said multiple descriptions; and
merging the decoded multiple descriptions to produce said first format.

44. A system for processing digital signals, comprising:
a converter configured to convert the digital signals between a first format and a second format, wherein said second format conveys multiple descriptions of said digital signals;
at least one error concealment processor configured to subject said digital signals to an error concealment process, wherein said at least one error concealment processor is configured to:
perform said error concealment process by filling gaps in said digital signals causing a loss of data;
identify candidate replacement data for filling said gaps as data packets having exactly identical sequence numbers as missing or erroneous data packets of the gaps; and
fill said gaps in one of said descriptions by decoding data taken from others of said descriptions and then re-encoding said data taken from others of said descriptions as replacement data for filling said gaps.

45. The system of claim 44, wherein said at least one error concealment processor is configured to fill said gaps in one of said descriptions by copying as replacement data for filling said gaps data taken from others of said descriptions.

46. The system of claim 44, wherein said digital signals are arranged in frames including macroblocks, each frame including a fixed number of data packets per frame, and said at least one error concealment processor is configured to:
identify a sequence number of at least one data packet giving rise to one of said gaps affecting said signals; and
determine at least one of: how many frames are affected, a number of a first macroblock affected, and a number of a last macroblock affected.

47. The system of claim 44, wherein said at least one error concealment processor is configured for identifying candidate replacement data for filling said gaps by examining previous and following data packets in the description containing the gap and in the others of said descriptions.

48. The system of claim 47, wherein said digital signals are arranged in frames, wherein previous packets in the description that contain the gap carry information for a first portion of a given frame and following packets in the description that contain the gap carry information for a second portion of a given frame, facilitate identification of the gap as data missing between said first and second portions, and said at least one error concealment processor is configured to:
at least partly decode the packets in said others of said descriptions to identify what portion of what frame is the one to which the information carried by others of said descriptions relates; and
fill said gap by means of replacement data packets taken from said others of said descriptions.

49. The system of claim 44, wherein said at least one error concealment processor is configured to fill said gaps by replacing each data packet involved in a gap by means of a replacement packet containing information identical to information carried by said data packet involved in the gap.

50. The system of claim 44, wherein said at least one error concealment processor is configured to fill said gaps by replacing one data packet involved in the gap by:
decoding a set of data packets taken from others of said descriptions and containing information identical to information carried by said data packet involved in the gap, and separating therefrom said information carried by said data packet involved in the gap;
encoding said information thus separated to produce a replacement packet; and
replacing said one data packet involved in the gap by said replacement packet obtained by encoding.

51. The system of claim 44, wherein said at least one error concealment processor is configured to:
discard a set of neighboring data packets including at least one data packet involved in the gap, and
replace said discarded set of neighboring data packets by a replacement data packet taken from said others of said descriptions.

52. The system of claim 44, wherein said at least one error concealment processor is configured to fill said gaps by replacing one data packet involved in the gap by a plurality of replacement packets containing the same information carried by said one data packet involved in the gap.

53. The system of claim 44, wherein said at least one error concealment processor is configured to fill said gaps by replacing a set of neighboring packets including at least one data packet involved in the gap by a plurality of replacement packets containing the same information carried by said set of neighboring packets including at least one data packet involved in the gap.

54. The system of claim 44, wherein said at least one error concealment processor is configured to:
discard a set of neighboring data packets including at least one data packet involved in the gap, and
replace said discarded set of neighboring data packets by a plurality of replacement data packets taken from said others of said descriptions.

55. The system of claim 44, wherein said at least one error concealment processor is configured to:
discard a set of neighboring data packets including at least one data packet involved in the gap;
decode a set of data packets taken from others of said descriptions and containing the same information carried by said one data packet involved in the gap, and separating therefrom said information carried by said one data packet involved in the gap;
encode said information thus separated to produce a plurality of replacement packets; and
replace said discarded set of neighboring data packets by said plurality of replacement packets obtained by encoding.

56. The system of claim 44, wherein said at least one error concealment processor is configured to fill said gaps in said digital signals causing the loss of data before said merging processor merges said decoded multiple descriptions to produce said first format.

57. The system of claim 44, wherein said at least one error concealment processor is configured for subjecting said digital signals to an error concealment process in converting said digital signals from said second format conveying multiple descriptions to said first format.

58. The system of claim 57, further comprising:
- at least one decoder for decoding said multiple descriptions; and
- at least one merging processor for merging the decoded multiple descriptions to produce said first format.

59. The system of claim 44, wherein said at least one error concealment processor is configured to fill said gaps by replacing at least one data packet involved in the gap by means of at least one fake replacement packet.

60. The system of claim 59, wherein said fake replacement packet includes information selected out of:
- gray or blank pixel information; and
- a related portion of a corresponding frame containing the same information as the same portion of a previous frame.

61. The system of claim 51, wherein said at least one error concealment processor is configured to allot to said replacement data packet the same sequence number of said one data packet involved in the gap.

62. The system of claim 61, wherein said at least one error concealment processor is configured to:
- check the sequence number of said replacement data packet for equality to the sequence number of said one data packet involved in the gap, and
- if said check reveals inequality, modify the sequence number of said replacement data packet before replacing said one data packet involved in the gap to render said sequence number of said replacement data packet equal to the sequence number of said one data packet involved in the gap being replaced thereby.

63. The system of claim 44, wherein said at least one error concealment processor is configured to:
- discard a set of neighboring data packets including at least one data packet involved in the gap; and
- replace said discarded set of neighboring data packets by a plurality of fake replacement packets.

64. The system of claim 63, wherein said at least one error concealment processor is configured to:
- check a sequence number of a first one of said plurality of replacement data packets for equality to a sequence number of said one data packet involved in the gap; and
- if said check reveals inequality, modify the sequence number of said first replacement data packet before replacing said one data packet involved in the gap to render said sequence number of said first replacement data packet equal to the sequence number of said one data packet involved in the gap.

65. The system of claim 63, wherein said at least one error concealment processor is configured to allot to said plurality of replacement packets sequence numbers having monotonically increasing values.

66. The system of claim 63, wherein said at least one error concealment processor is configured to add an offset to sequence numbers of packets following said one data packet involved in the gap.

67. The system of claim 44, wherein said at least one error concealment processor is configured to fill said gaps in said digital signals causing the loss of data after said merging processor merges said decoded multiple descriptions to produce said first format.

68. The system of claim 67, wherein said decoder is configured to identify said gaps by checking for either of null or threshold values of luminance and/or chrominance components.

69. The system of claim 67, wherein said decoder is configured to decode each of said descriptions twice, using a first pass wherein the decoder is configured for identifying said gaps and a second pass wherein the decoder is configured for error concealment applied to said descriptions decoded in said second pass.

70. The system of claim 67, wherein said at least one error concealment processor is configured to:
- compute an average value of said digital signals corresponding to said decoded multiple descriptions; and
- discard outlier signal values of said digital signals characterized by a largest difference with respect to said average value computed.

71. The system of claim 70, wherein said at least one error concealment processor is configured to:
- express said digital signal as pixel values; and
- exclude said outlier signal values in computing said average value.

72. The system of claim 67, wherein said at least one error concealment processor is configured to:
- express said digital signal as pixel values;
- compute a median value of said digital signals using said decoded multiple descriptions; and
- take said median value as a replacement for the current pixel.

73. The system of claim 72, wherein said at least one error concealment processor is configured to compute said median value as either of vector median filtering and scalar median filtering.

74. The system of claim 67, wherein said decoder is configured to highlight said gaps.

75. The system of claim 74, wherein said decoder is configured to highlight said gaps by causing said gaps to correspond to given luminance and/or chrominance values.

76. The system of claim 67, wherein said decoder is configured to fill said gaps by a weighted average of valid neighboring pixels.

77. The system of claim 76, wherein said decoder is configured to select said replacement weighted average out of a vertical average, a horizontal average, and two diagonals averages.

* * * * *